(12) United States Patent
Mori et al.

(10) Patent No.: US 10,116,442 B2
(45) Date of Patent: Oct. 30, 2018

(54) DATA STORAGE APPARATUS, DATA UPDATING SYSTEM, DATA PROCESSING METHOD, AND COMPUTER READABLE MEDIUM

(71) Applicant: MITSUBISHI ELECTRIC CORPORATION, Tokyo (JP)

(72) Inventors: Takumi Mori, Tokyo (JP); Yutaka Kawai, Tokyo (JP); Nori Matsuda, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 15/548,071

(22) PCT Filed: Feb. 20, 2015

(86) PCT No.: PCT/JP2015/054874
§ 371 (c)(1),
(2) Date: Aug. 1, 2017

(87) PCT Pub. No.: WO2016/132547
PCT Pub. Date: Aug. 25, 2016

(65) Prior Publication Data
US 2018/0026785 A1   Jan. 25, 2018

(51) Int. Cl.
*H04L 9/30* (2006.01)
*H04L 9/08* (2006.01)
*G06F 21/62* (2013.01)

(52) U.S. Cl.
CPC ........ *H04L 9/0891* (2013.01); *G06F 21/6218* (2013.01); *H04L 9/0894* (2013.01); *H04L 9/30* (2013.01); *H04L 2209/76* (2013.01)

(58) Field of Classification Search
CPC ....................................................... H04L 19/30
See application file for complete search history.

(56) References Cited

U.S. PATENT DOCUMENTS 8,171,307 B1 * 5/2012 Chang .................... G06F 21/80
380/239
8,913,742 B2   12/2014 Takashima et al.
(Continued)

FOREIGN PATENT DOCUMENTS

JP            10-260903 A    9/1998
JP         2003-177967 A    6/2003
(Continued)

OTHER PUBLICATIONS

Hur et al., "Attribute-Based Access Control with Efficient Revocation in Data Outsourcing Systems", IEEE Transactions on Parallel and Distributed Systems, vol. 22, No. 7, Jul. 2011, pp. 1214-1221.
(Continued)

*Primary Examiner* — William S Powers
(74) *Attorney, Agent, or Firm* — Birch, Stewart, Kolasch & Birch, LLP

(57) ABSTRACT

A data storage unit (202) stores encrypted data while remaining in an encrypted state, and stores decryption conditions to define a user attribute of a decryption-permission user who is permitted to decrypt the encrypted data. In a case wherein revocation information to indicate a user attribute of a revoked user who is no longer the decryption-permission user has been added to the decryption condition when update timing arrives, a revocation information removing unit (206) removes the revocation information from the decryption condition while the encrypted data remains in the encrypted state. Further, the revocation information removing unit (206) transmits the encrypted data and the decryption conditions from which the revocation information has been removed to a re-encryption apparatus that performs re-encryption in a proxy re-encryption scheme, and receives, from the re-encryption apparatus, the encrypted data that has be re-encrypted in the proxy re-encryption scheme using the decryption condition from
(Continued)

which the revocation information has been removed. A refresh processing unit (205) updates the encrypted data that has been re-encrypted and the decryption condition from which the revocation information has been removed.

10 Claims, 23 Drawing Sheets

(56) References Cited

U.S. PATENT DOCUMENTS

| | | | |
|---|---|---|---|
| 9,237,013 B2 | 1/2016 | Ichikawa et al. | |
| 9,635,001 B2 | 4/2017 | Kaseda et al. | |
| 2003/0210790 A1* | 11/2003 | Riedel | G06F 21/6218 380/277 |
| 2009/0100529 A1* | 4/2009 | Livnat | G06F 21/10 726/28 |
| 2011/0320809 A1* | 12/2011 | Amendola | H04L 9/088 713/158 |
| 2013/0028415 A1 | 1/2013 | Takashima et al. | |
| 2013/0339726 A1 | 12/2013 | Yoshida et al. | |
| 2014/0310521 A1 | 10/2014 | Ichikawa et al. | |
| 2015/0312260 A1* | 10/2015 | Kim | H04L 51/32 713/152 |
| 2016/0119292 A1 | 4/2016 | Kaseda et al. | |

FOREIGN PATENT DOCUMENTS

| | | |
|---|---|---|
| WO | 2011/135895 A1 | 11/2011 |
| WO | 2012/111714 A1 | 8/2012 |
| WO | WO 2013/069505 A1 | 5/2013 |
| WO | 2013/094018 A1 | 6/2013 |
| WO | 2014/083784 A1 | 6/2014 |

OTHER PUBLICATIONS

Ito et al., "Revocation Management in Functional Encryption", SCIS 2014, The 31st Symposium on Cryptography and Information Security Kagoshima, Japan, Jan. 21-24, 2014, The Institute of Electronics, Information and Communication Engineers, pp. 1-6.
Jahid et al., "EASiER: Encryption-based Access Control in Social Networks with Efficient Revocation", pp. 411-415.
Kawai et al., "Fully-Anonymous Functional Proxy-Re-Encryption", Oct. 11, 2013, pp. 1-72.
Kawai et al., "Toward Efficient Multi-Hop Functional Proxy-Re-Encryption", SCIS 2014, The 31st Symposium on Cryptography and Information Security Kagoshima, Japan, Jan. 21-24, 2014, The Institute of Electronics, Information and Communication Engineers, pp. 1-8.
Mori et al., "An Easy-to-use File-Sharing System Using Functional Encryption", pp. 746-751, 2014.
Zu et al., "New Ciphertext-Policy Attribute-Based Encryption with Efficient Revocation", 2014 IEEE International Conference on Computer and Information Technology, pp. 281-287.

* cited by examiner

Fig.14

| ATTRIBUTE TYPE | ATTRIBUTE VALUE |
|---|---|
| ID | 1001, 1002, 1003, 1004 |
| NAME | HIROSHI TAKAHASHI, TOMOKO KOBAYASHI, KENICHI SUZUKI, TETSUYA SATOU |
| DEPARTMENT | ACCOUNTING DEPARTMENT, PERSONNEL DEPARTMENT |
| SECTION | ACCOUNTING SECTION, BUDGET SECTION |
| POST | DEPARTMENT MANAGER, SECTION MANAGER, CONTACT |

Fig. 15

| USER NAME | USER ATTRIBUTE |
|---|---|
| HIROSHI TAKAHASHI | ID=1001, NAME=HIROSHI TAKAHASHI, DEPARTMENT=PESONNEL DEPARTMENT, SECTION=NULL, POST=DEPARTMENT MANAGER |
| TOMOKO KOBAYASHI | ID=1002, NAME=TOMOKO KOBAYASHI, DEPARTMENT=ACCOUNTING DEPARTMENT, SECTION=BUDGET SECTION, POST=CONTACT |
| KENICHI SUZUKI | ID=1003, NAME=KENICHI SUZUKI, DEPARTMENT=ACCOUNTING DEPARTMENT, SECTION=NULL, POST=DEPARTMENT MANAGER |
| TETSUYA SATOU | ID=1004, NAME=TETSUYA SATOU, DEPARTMENT=ACCOUNTING DEPARTMENT, SECTION=BUDGET SECTION, POST=SECTION MANAGER |

Fig. 18

| USER ID | USER NAME | BELONGING DEPARTMENT | BELONGING SECTION | POST |
|---|---|---|---|---|
| 1003 | KENICHI SUZUKI | ACCOUNTING DEPARTMENT | NULL | DEPARTMENT MANAGER |
| 1004 | TETSUYA SATOU | ACCOUNTING DEPARTMENT | BUDGET SECTION | SECTION MANAGER |
| 1002 | TOMOKO KOBAYASHI | ACCOUNTING DEPARTMENT | BUDGET SECTION | CONTACT |
| 1001 | HIROSHI TAKAHASHI | PERSONNEL DEPARTMENT | NULL | DEPARTMENT MANAGER |

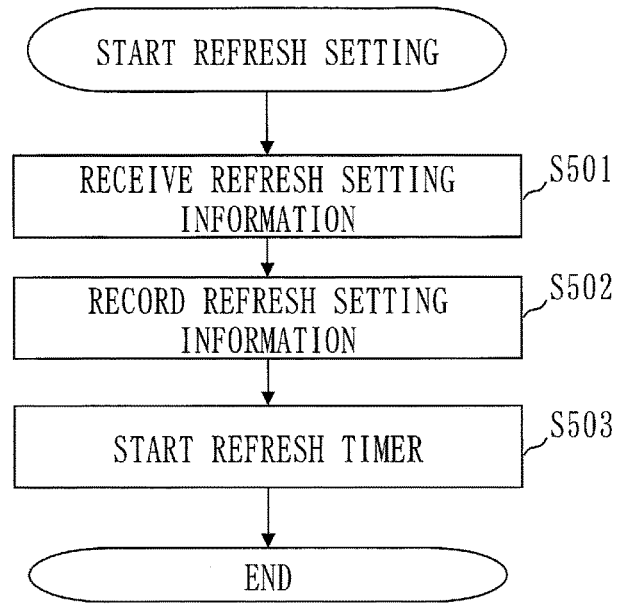
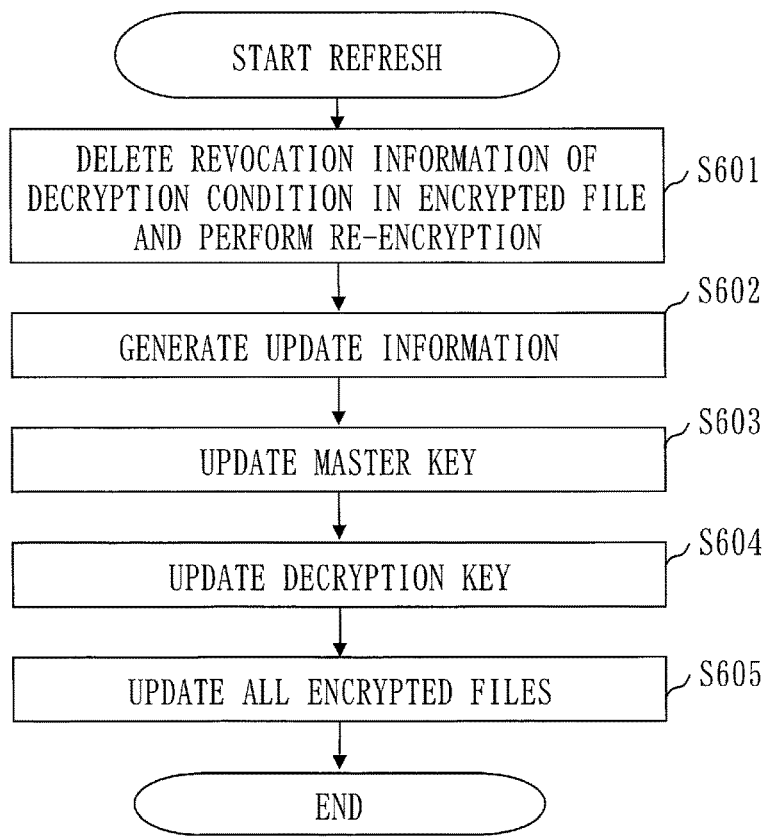

DATA STORAGE APPARATUS, DATA UPDATING SYSTEM, DATA PROCESSING METHOD, AND COMPUTER READABLE MEDIUM

TECHNICAL FIELD

The present invention relates to techniques for managing encrypted data.

BACKGROUND ART

In recent years, use methods have been widely employed, in which file servers on the Internet store electronic data (hereinafter simply referred to as data) and various devices (for example, a notebook PC (Personal Computer), a tablet terminal and a smart phone) access the file servers and use the data.

Such use methods of data are highly convenient, whereas the user methods involve a risk that an unintended third party on the Internet refers to the data. Therefore, operation of information security, such as encryption and access control, is essential for confidential data.

In a case of operating a file encryption system for a long period of time, there is a problem of deterioration (imperilment) of the cipher strength according to continuous use of a same cryptographic key (a pair of a public key and a secret key in a case of public key encryption).

The problem of imperilment is dealt with, in many examples, regenerating encryption keys periodically, and re-encrypting encrypted data.

For example, in a case of PKI (Public Key Infrastructure), a term of validity is set for a public key certificate, wherein a key is regenerated and the public key certificate is updated before the term of validity is reached.

Similarly in a file encryption system, in order to prevent the cipher strength from deteriorating due to use of a same cryptographic key for a long period of time, an operation of updating an encryption key periodically is necessary (periodic update of an encryption key is called master key update).

There are several methods of master key update, for example, in a case of an RSA (registered trademark) encryption, all key pairs are regenerated, and all encrypted data is re-encrypted.

In this method, since the encrypted data is decrypted once, there is a security issue, and a great amount of time is required for decryption and re-encryption processing of all the encrypted data stored, and further, the processing cost is extremely high.

In a case of an ID (Identifier)-based encryption, a master key is regenerated, and all encrypted data is re-encrypted.

In a case of the ID-based encryption, in order to prevent the contents of the encrypted data from leaking, it is necessary to execute re-encryption while the encrypted data remains encrypted.

As an encryption technique that satisfies both of complicated access control and encryption, there exists an encryption technique called a functional encryption scheme described in Patent Literature 1.

The functional encryption scheme is a type of a public key cryptosystem.

Unlike an RSA (registered trademark) encryption currently used as the mainstream, the functional encryption scheme is an encryption scheme which enables decryption of encrypted data with a decryption key to restore the data when a prescribed relation is established between a parameter (hereinafter referred to as a decryption condition) set at the time of encrypting the data, and a parameter (hereinafter referred to as attribute information) set to the decryption key.

For example, a logical formula such as "department=general affairs department AND section=personnel section" is set as a decryption condition at the time of encrypting data, and "department=general affairs department, section=accounting section" is set for a decryption key as attribute information representing a holder of the decryption key.

Then, decryption of the encrypted data is possible only when relation between the decryption condition set at the time of encrypting the data, and the attribute information set for the decryption key is true.

Hereinafter, encrypted data and a decryption condition are collectively called an encrypted file.

As a method to change a decryption condition while keeping an encrypted file that has been encrypted in a functional encryption scheme encrypted, there is a method as described in Non-patent Literature 1.

The scheme described in Non-patent Literature 1 is referred to as a proxy re-encryption scheme.

In the proxy re-encryption scheme, by using a key for re-encryption referred to as a re-encryption key, it is possible to change a decryption condition without decrypting the encrypted file.

However, the scheme described in Non-patent Literature 1 is inefficient, whereby re-encryption can be executed only one to a few times in practice.

Therefore, in the scheme of Non-Patent Literature 2, efficiency is improved from the scheme of Non-Patent Literature 1, where there is no practical limit in the number of re-encryption.

CITATION LIST

Patent Literature

Patent Literature 1: WO 2011/135895 A

Non-Patent Literature

Non-Patent Literature 1: Y. Kawai and K. Takashima, "Fully-Anonymous Functional Proxy-Re-Encryption," ePrint 2013

Non-Patent Literature 2: Yutaka Kawai and Katsuyuki Takashima, "Toward Efficient Multi-Hop Functional Proxy-Re-Encryption," SCIS2014

SUMMARY OF INVENTION

Technical Problem

As issues associated with a file encryption system in a business organization, there are deterioration (imperilment) of the strength of cryptographic keys with age, leakage of keys, and so on.

As a simple dealing method, there is a method to regenerate an encryption key, decrypt encrypted files once, and re-encrypt the encrypted files with the cryptographic key that has been regenerated.

However, since a risk of information leakage occurs when the encrypted files are decrypted, it is necessary to re-encrypt the encrypted files in an encrypted state.

Further, there is a case wherein revocation information "AND NOT [ID information]" is attached to decryption conditions for encrypted files encrypted in a functional encryption.

In a case of regenerating encryption keys, encryption keys of revoked users are not regenerated; thus, revocation information is unnecessary.

Therefore, when re-encryption is executed to encrypted files wherein revocation information is attached to decryption conditions, while the revocation information remains attached to the encrypted files, unnecessary operation for the decryption conditions is performed at the time of decryption; hence the cryptographic performance is degraded.

The present invention is made in consideration of the above-mentioned circumstances, and is mainly aimed at obtaining a configuration to avoid deterioration of the cryptographic performance at the time of re-encrypting encrypted data.

Solution to Problem

A data storage apparatus according to the present invention includes:

a data storage unit to store encrypted data that has been encrypted, while remaining in an encrypted state, and to store a decryption condition, whereby a user attribute of a decryption-permission user who is permitted to decrypt the encrypted data is defined;

a revocation information removing unit to remove, in a case wherein revocation information which indicates a user attribute of a revoked user who is no longer the decryption-permission user has been added to the decryption condition when update timing to update the encrypted data and the decryption condition arrives, the revocation information from the decryption condition while the encrypted data remains in an encrypted state, to transmit the encrypted data and the decryption condition from which the revocation information has been removed, to a re-encryption apparatus that performs re-encryption in a proxy re-encryption scheme, and to receive from the re-encryption apparatus, the encrypted data that has been re-encrypted in the proxy re-encryption scheme using the decryption condition from which the revocation information has been removed; and a refresh processing unit to update the encrypted data that has been re-encrypted and received by the revocation information removing unit, and the decryption condition from which the revocation information has been removed.

Advantageous Effects of Invention

According to the present invention, revocation information is removed from decryption conditions while encrypted data remains in an encrypted state, and the encrypted data is re-encrypted with the decryption conditions from which the revocation information has been removed.

Thus, according to the present invention, it is possible to avoid deterioration of the cryptographic performance.

BRIEF DESCRIPTION OF DRAWINGS

FIG. 14 is a diagram illustrating an example of attribute types and attribute values of user attributes according to the first embodiment;

FIG. 15 is a diagram illustrating an example of a list of users according to the first embodiment;

FIG. 18 is a diagram illustrating an example of information stored in a user information terminal apparatus according to the first embodiment;

FIG. 21 is a flowchart diagram illustrating an example of refresh setting processing according to the first embodiment;

FIG. 22 is a flowchart diagram illustrating an example of refresh processing according to the first embodiment;

DESCRIPTION OF EMBODIMENTS

First Embodiment

Figure 1:
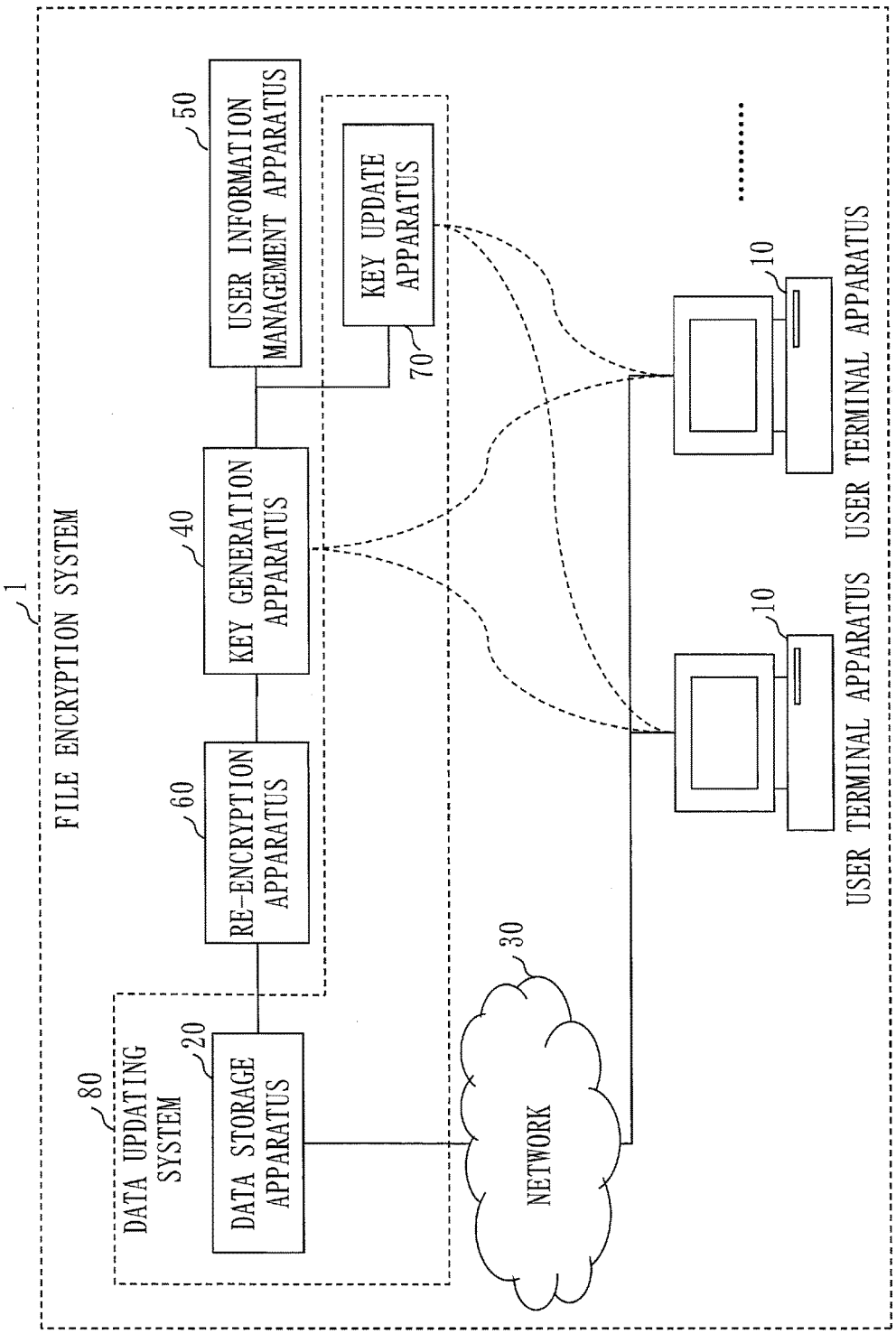
FIG. 1 is a diagram illustrating a configuration example of a file encryption system according to a first embodiment.

In the present embodiment and the following embodiments, a file encryption system using a functional encryption scheme will be described.

In the file encryption system according to the present embodiment and the following embodiments, by taking advantage of the characteristics of the functional encryption scheme, a NOT condition (revocation information) is removed from a decryption condition while encrypted data remains encrypted, the encrypted data and the decryption condition from which the revocation information has been removed are re-encrypted, and a master key updating is performed.

Here, before describing the present embodiment in detail, addition of revocation information and removal of the revocation information will be schematically described.

In a case of the functional encryption based on the Okamoto-Takashima encryption scheme in Patent Literature 1, a master key is represented by a plurality of basis vectors on dual pairing vector spaces.

By taking advantage of this characteristic, through executing operation between a random matrix and basis vectors, conversion similar to generation of a new master key can be executed.

Further, conversion of the basis vectors can be applied to user secret keys and ciphertexts as well; thus, update of a master key, user secret keys and ciphertexts can be attained while remaining in an encrypted state.

In the functional encryption, as mentioned above, user attributes of users who are permitted to decrypt encrypted data (decryption-permission user) are defined in decryption conditions.

When a certain user becomes no longer a decryption permission user due to personal transfer, etc., there is a case wherein revocation information in which a user attribute of the user (revoked user) who is no longer the decryption-permission user is indicated is added to decryption information, and the revoked user is removed from a decryption condition.

Specifically, revocation information "AND NOT [ID information]" is attached to a decryption condition, and the revoked user who is specified by the [ID information] is removed from the decryption condition.

For example, when Mr./Ms. A, who belongs to "general affairs department, general affairs section" is transferred to "accounting department, accounting section," revocation information of "AND NOT A" is added to a decryption condition "general affairs department AND general affairs section" to make a decryption condition "general affairs department AND general affairs section AND NOT A."

This processing is based on the assumption that Mr./Ms. A keeps a decryption key for "general affairs department, general affairs section" even after transfer.

Since the revocation information to remove Mr./Ms. A is added to the decryption condition, Mr./Ms. A cannot decrypt encrypted data even with the decryption key for the "general affairs department, general affairs section" that Mr./Ms. A holds.

When a master key is updated, the old decryption key of Mr./Ms. A for the "general affairs department, general affairs section" is revoked; hence, the decryption condition should be "general affairs department AND general affairs section" and not "general affairs department AND general affairs section AND NOT A."

Therefore, in the present embodiment, the revocation information "AND NOT A" is removed from the decryption condition "general affairs department AND general affairs section AND NOT A" once to make "general affairs department AND general affairs section", then encrypted data is re-encrypted in a proxy re-encryption scheme and a master key is updated.

As stated above, in the present embodiment, by removing unnecessary revocation information from decryption conditions, the cryptographic performance is prevented from deteriorating.

Here, processing for adding revocation information to decryption conditions is referred to as revocation processing, and processing for removing revocation information from decryption conditions is referred to as revocation information removing processing.

Hereinafter, the present embodiment will be described in detail.

In the present embodiment, a method to encrypt data by a client (user terminal apparatus) in a client server model will be described.

Further, in the present embodiment, a method to store encrypted data and a decryption condition in a data storage apparatus will be described.

Furthermore, a method to decrypt the encrypted data stored will be described.

Additionally, a method to update a master key to handle imperilment of encryption keys with age will be described.

Explanation of Configuration

<Configuration and Function of File Encryption System 1>

FIG. 1 illustrates a configuration example of a file encryption system 1 according to a first embodiment.

As illustrated in FIG. 1, in the file encryption system 1, one or more user terminal apparatuses 10 are connected to a data storage apparatus 20 via a network 30.

Further, a key generation apparatus 40 is connected to a user information management apparatus 50.

Additionally, a re-encryption apparatus 60 is connected to the data storage apparatus 20 and the key generation apparatus 40.

The key generation apparatus 40 is connected to the user terminal apparatuses 10 only when needed in such a case as distributing a key, etc.

The user terminal apparatus 10 is a client apparatus having a communication function.

The user terminal apparatus 10 is, for example, a desktop PC, a notebook PC, a smart phone, a tablet terminal, and so on.

The data storage apparatus 20 is, for example, a file server apparatus.

The data storage apparatus 20 may be composed of a plurality of computers.

Here, the data storage apparatus 20 may be a so-called cloud storage on the Internet.

However, it is necessary for the data storage apparatus 20 to have reliability capable of realizing a function as a file storage and functions as described below.

The network 30 is, for example, the Internet or a network structured by a dedicated line.

The key generation apparatus 40 is a server apparatus that manages encryption keys.

The key generation apparatus 40 may be composed of a plurality of computers access to which is controlled.

Encryption keys and the like stored inside the key generation apparatus 40 are all managed secretly by encryption or access control.

It will suffice as long as the user information management apparatus 50 is a directory server to manage organization information, such as LDAP (LIGHTWEIGHT Directory Access Protocol) or AD (Active Directory (registered trademark)) of Microsoft (registered trademark) Corp.

The re-encryption apparatus 60 is a server apparatus to re-encrypt encrypted data stored in the data storage apparatus 20 using a re-encryption key issued from the key generation apparatus 40.

The re-encryption apparatus 60 may be composed of a plurality of computers.

A key update apparatus 70 updates decryption keys as stated below, distributed to the user terminal apparatuses 10.

Here, the data storage apparatus 20 and the key update apparatus 70 are collectively called a data updating system 80.

Figure 2:
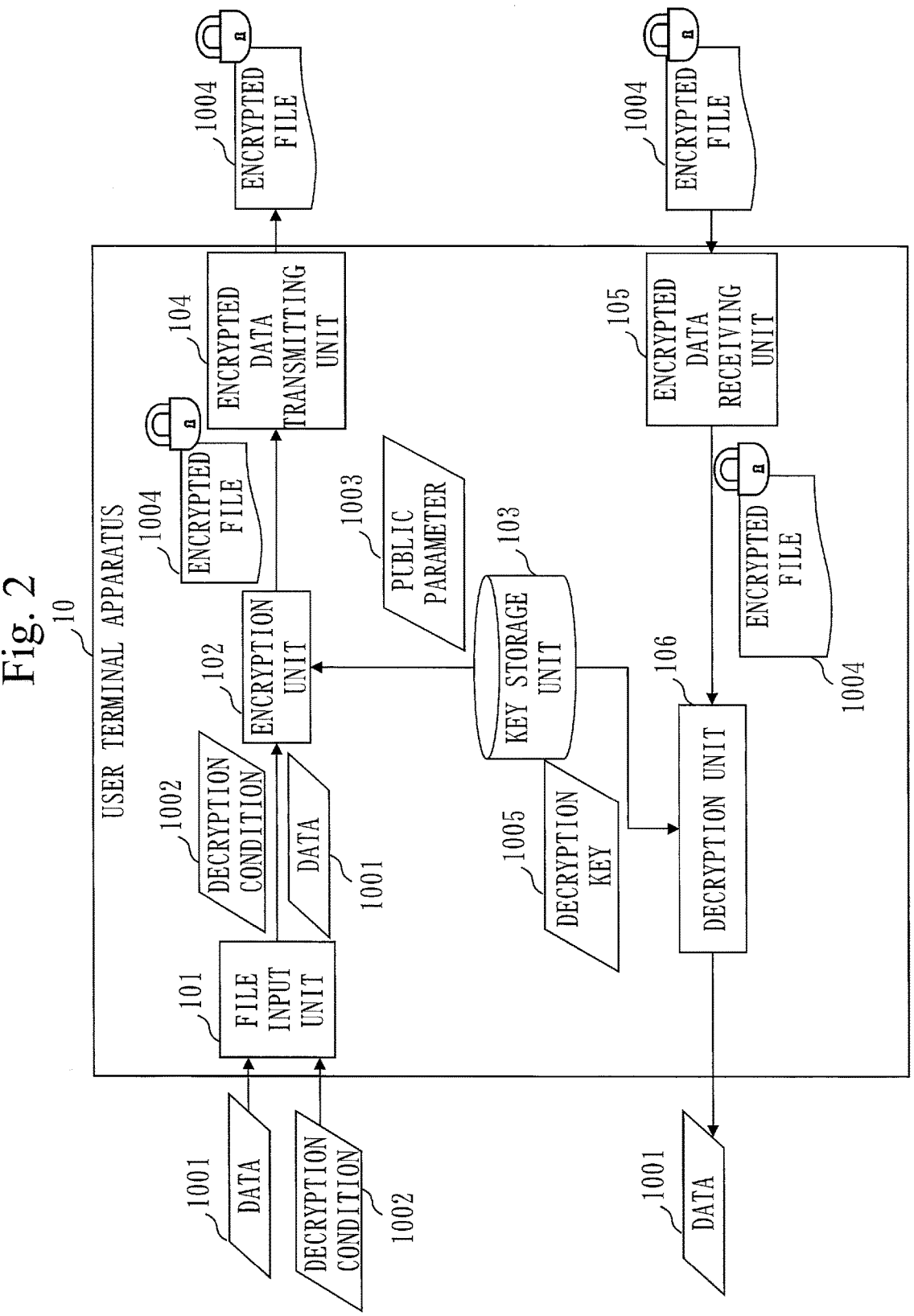
FIG. 2 is a diagram illustrating a configuration example of function modules in a user terminal apparatus according to the first embodiment.

FIG. 2 describes a configuration example of function modules in the user terminal apparatus 10.

Data 1001 is electronic data (plaintext data) as an object to be encrypted using the file encryption system 1 and to be stored.

The data 1001 is, for example, text data, audio data and movie data.

A decryption condition 1002 is information to indicate a user of the user terminal apparatus 10, who is capable of browsing the data 1001.

That is, the decryption condition 1002 is information that defines user attributes of decryption-permission users who are permitted to decrypt the encrypted data.

The decryption condition 1002 is represented in a form of a logical formula.

The decryption condition 1002 is represented by a combination of [attribute type]=[attribute value], operators to connect them, and "0" indicating evaluation priority of the logical formula, e.g., "department=accounting department AND section=budget section."

As the operator, there are "AND" denoting logical product, "OR" denoting logical sum, "NOT" denoting negation, etc. for example.

A public parameter 1003 is a public key (encryption key) for public key encryption that exists only one in the file encryption system 1.

In the present embodiment, as public key encryption, encryption (for example, functional encryption) wherein a person who is capable of decryption can be designated by a logical formula (also called predicate) is used.

Since the public parameter 1003 is not information to be kept secret, the public parameter 1003 may be stored in an arbitrary place (for example, it may be inside a PC making up the file encryption system 1, an external storage or a server on the Internet, etc.).

An encrypted file 1004 is composed of the data 1001 encrypted using functional encryption with the public parameter 1003 and the decryption condition 1002, and the decryption condition 1002.

Figure 3:
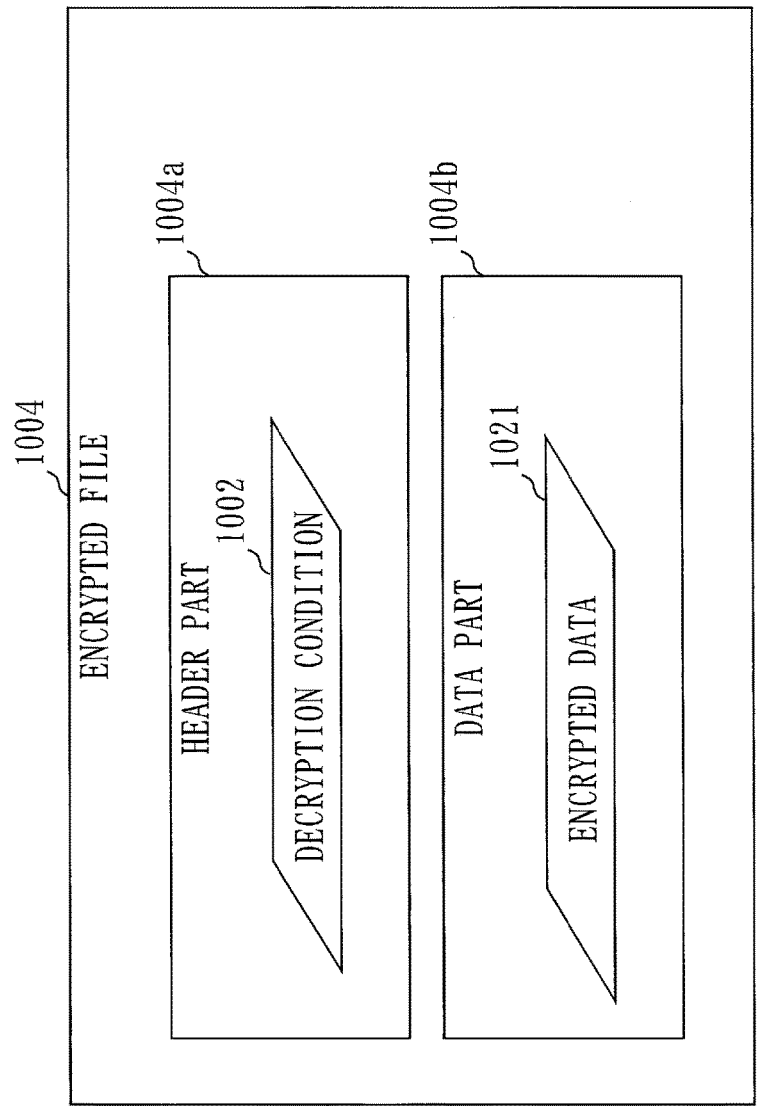
FIG. 3 is a diagram illustrating a header part and a data part of an encrypted file according to the first embodiment.

The encrypted file 1004 is composed of a header part 1004a and a data part 1004b as described in FIG. 3.

In the header part 1004a, the decryption condition 1002 designated at the time of encryption is stored. In the data part 1004b, encrypted data 1021 as the data 1001 encrypted is stored.

A decryption key 1005 is a decryption key for decrypting the encrypted file 1004.

The decryption key 1005 is made to correspond to the decryption-permission user.

In the decryption key 1005, attribute information (represented in a format where [attribute type]=[attribute value] are enumerated like "ID=1001, department=accounting department, section=budget section," for example) of the decryption-permission users is embedded.

Here, decryption of an encrypted file 1004 is possible if a decryption key 1005 has attribute information that matches the decryption condition 1002 designated at the time of encrypting the encrypted file 1004.

A file input unit 101 receives the data 1001 and the decryption condition 1002.

The file input unit 101 transfers the data 1001 and the decryption condition 1002 that have been received, to an encryption unit 102.

The encryption unit 102 receives the data 1001, the decryption condition 1002 and the public parameter 1003 as input and encrypts the data 1001 according to functional encryption with the public parameter 1003, taking the decryption condition 1002 as a parameter.

A key storage unit 103 stores the decryption key 1005 made to correspond to the user terminal apparatus 10, and the public parameter 1003.

An encrypted data transmitting unit 104 transmits the encrypted file 1004 to the data storage apparatus 20.

An encrypted data receiving unit 105 receives the encrypted file 1004 from the data storage apparatus 20, and transfers the encrypted file 1004 received to a decryption unit 106.

The decryption unit 106 retrieves a decryption key 1005 from the key storage unit 103, and restores the encrypted data 1021 to the data 1001 by decrypting the encrypted file 1004 with the decryption key 1005 retrieved.

Figure 4:
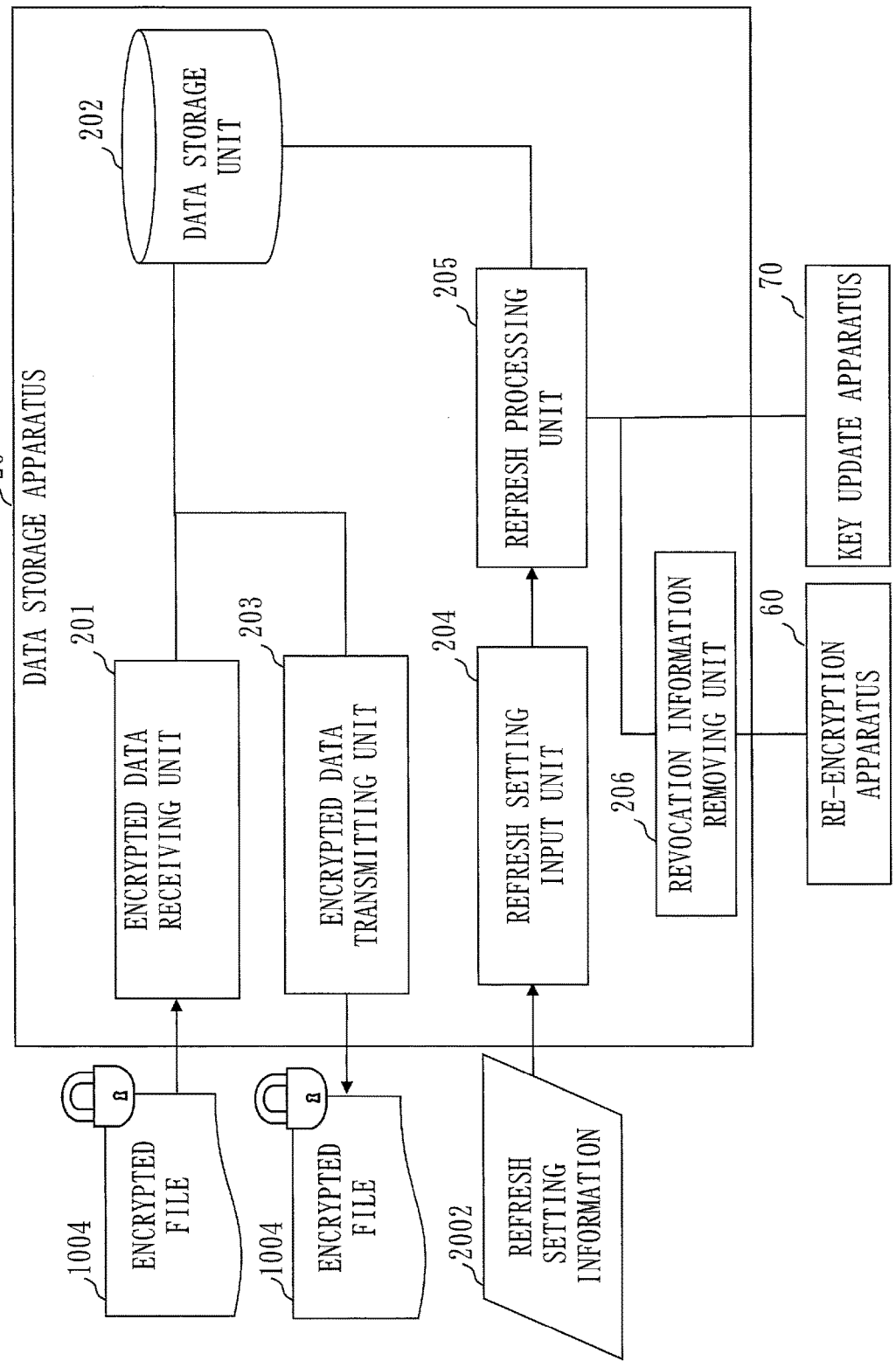
FIG. 4 is a diagram illustrating a configuration example of function modules in a data storage apparatus according to the first embodiment.

FIG. 4 illustrates a configuration example of function modules in the data storage apparatus 20.

An encrypted data receiving unit 201 receives an encrypted file 1004 (encrypted data 1021 and a decryption condition 1002) from a user terminal apparatus 10, and stores the same in a data storage unit 202.

The data storage unit 202 stores one and more encrypted files 1004.

The data storage unit 202 stores the encrypted data 1021 that has been received by the encrypted data receiving unit 201 while remaining in the encrypted state.

An encrypted data transmitting unit 203 transfers the encrypted file 1004 stored in the data storage unit 202 to the user terminal apparatus 10.

Refresh setting information 2002 is information to specify an interval of refresh processing performed at a refresh processing unit 205.

Here, the refresh processing will be described below in detail.

A refresh setting input unit 204 receives refresh setting information 2002 input by a user, and transfers the refresh setting information 2002 to the refresh processing unit 205.

The refresh processing unit 205 performs refresh processing periodically at intervals specified by the refresh setting information 2002.

As the refresh processing, the refresh processing unit 205 retrieves all encrypted files 1004 stored in the data storage unit 202, and after the revocation information is deleted from the decryption conditions by a revocation information removing unit 206 as described below, and the encrypted files 1004 are re-encrypted in the proxy re-encryption scheme as disclosed in Non-Patent Literature 2, performs update processing of the encrypted files 1004 that have been re-encrypted.

The revocation information removing unit 206 removes the revocation information of "AND NOT [ID information]"

attached to the decryption condition of the encrypted file 1004 in the revocation processing.

That is, when the revocation information is added to the decryption condition 1002 of the encrypted file 1004, the revocation information removing unit 206 removes the revocation information from the decryption condition 1002 while the encrypted data 1021 remains in an encrypted state.

Further, the revocation information removing unit 206 transmits the encrypted data 1021 and the decryption condition 1002 from which the revocation information has been removed, to the re-encryption apparatus 60.

The re-encryption apparatus 60 performs re-encryption of the encrypted data 1021 in the proxy re-encryption scheme with the decryption condition 1002 from which the revocation information has been removed.

The revocation information removing unit 206 receives the encrypted data 1021 that has been re-encrypted in the proxy re-encryption scheme, from the re-encryption apparatus 60.

FIG. 5 through FIG. 8 illustrate configuration examples of function modules in the key generation apparatus 40 and the user information management apparatus 50.

Here, in FIG. 5 through FIG. 8, the configuration of the function modules in the key generation apparatus 40 is illustrated by dividing the configuration for each processing.

The key generation apparatus 40 is composed of a master key generation unit 401, a master key storage unit 402, a public parameter issuance unit 403, a user authentication unit 404, a user attribute acquisition unit 405, a decryption key generation unit 406, a re-encryption key generation unit 407, an update information generation unit 408, an update information storage unit 409, an update information acquisition unit 410 and a master key update processing unit 411, as described in FIG. 5 through FIG. 8.

(Explanation of FIG. 5): Master Key Generation-Related Function

A master public key 4001 and a master secret key 4002 are originally generated and retained by the key generation apparatus 40.

The master public key 4001 is a master key of a public parameter 1003 (encryption key) used in encryption from the data 1001 to the encrypted data 1021.

Usually, only one pair of a master public key 4001 and a master secret key 4002 is generated for the file encryption system 1.

While the master public key 4001 is public information, the master secret key 4002 can generate all the decryption keys 1005; therefore, it is necessary to store the master secret key 4002 secretly inside the key generation apparatus 40 in some manner.

A public parameter acquisition request 4003 is request data to be issued for acquiring the public parameter 1003.

For example, if HTTP (Hypertext Transfer Protocol) is used for communication between the user terminal apparatuses 10 and the key generation apparatus 40, when the user terminal apparatuses 10 acquire the public parameter 1003, the public parameter acquisition request 4003 is a public parameter acquisition URL (Uniform Resource Locator).

The master key generation unit 401 generates a pair (hereinafter called a master-key pair) of a master public key 4001 and a master secret key 4002.

The master key storage unit 402 stores the master-key pair generated by the master key generation unit 401.

The public parameter issuance unit 403 generates the public parameter 1003 by applying a digital signature of the key generation apparatus 40 to the master public key 4001.

Since the public parameter 1003 is public information, it is possible to deliver the public parameter 1003 using means of WEB disclosure, e-mail transmission, and sending in a data recording medium, etc.

(Explanation of FIG. 6): Decryption Key Generation-Related Function

A user ID 4004 is information (for example, an employee number or a mail address) whereby a user can be uniquely identified.

The user authentication unit 404 authenticates a user ID 4004 received from a user terminal apparatus 10.

The user authentication unit 404 may perform authentication using an electronic certificate, or authentication using a password, for example.

A user attribute 4005 is information to express an attribute of a user who is made to correspond to a decryption key 1005.

In a case of a corporation, for example, the user attribute 4005 is expressed in a department, a section, a name, an employee ID, etc.

The expression form is in a form of enumerating [attribute type]=[attribute value] similarly to the decryption conditions, e.g., "department=general affairs department, section=personnel section, post=department manager."

The user attribute acquisition unit 405 acquires a user attribute 4005 taking the user ID 4004 as a key, from the user information management apparatus 50.

The decryption key generation unit 406 generates a decryption key 1005 using the master secret key 4002 and the user attribute 4005.

(Explanation of FIG. 7): Re-Encryption Key Generation-Related Function

A re-encryption condition 4006 is a new decryption condition to be designated at the time of re-encrypting the encrypted file 1004.

A re-encryption key 4007 is a key used at the time of re-encrypting the encrypted file 1004.

Receiving the user attribute 4005 and the re-encryption condition 4006 as input, the re-encryption key generation unit 407 generates the re-encryption key 4007 and transmits the re-encryption key 4007 to the re-encryption apparatus 60.

(Explanation of FIG. 8): Update Information Generation-Related Function

Update information 4008 is information used for updating the master public key 4001, the master secret key 4002, the decryption keys 1005 and the encrypted files 1004.

Figure 9:
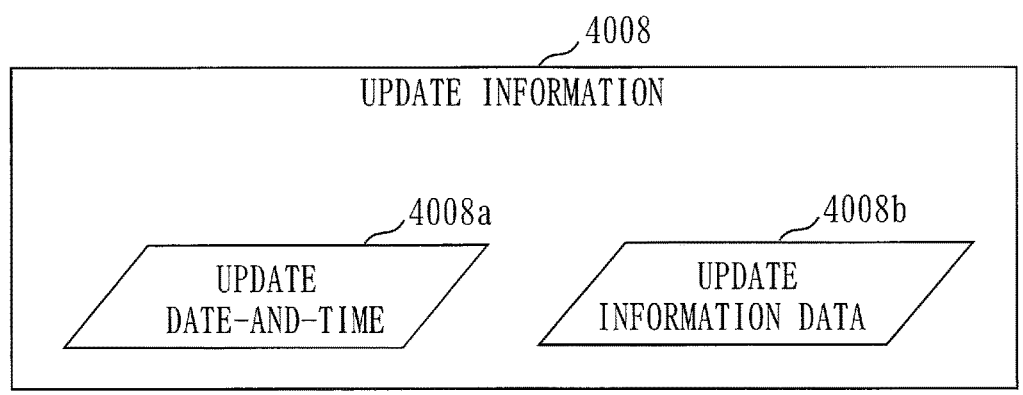
FIG. 9 is a diagram illustrating an example of update information according to the first embodiment.

The update information 4008 includes an update date-and-time 4008a and update information data 4008b, as illustrated in FIG. 9.

The update information data 4008b is conversion information to convert components constituting an encryption key in a functional encryption and encrypted data to obtain the same effect as regenerating cryptographic keys and encrypted data.

Figure 10:
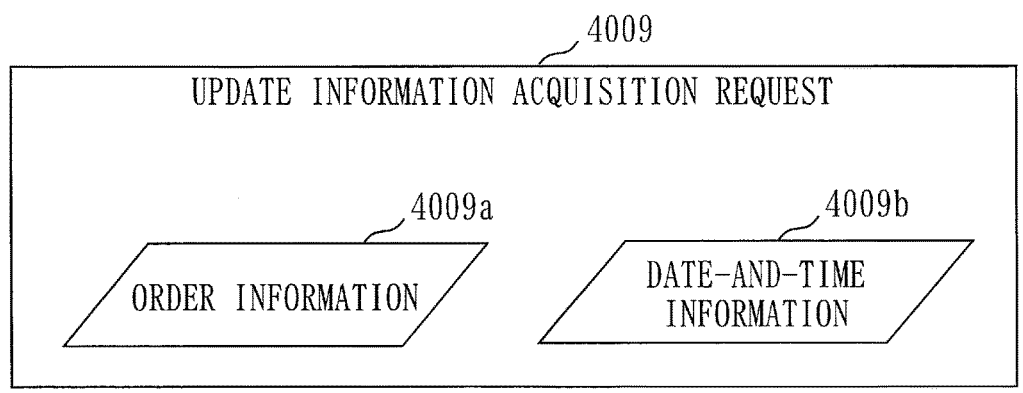
FIG. 10 is a diagram illustrating an example of an update information acquisition request according to the first embodiment.

An update information acquisition request 4009 includes order information 4009a and date-and-time information 4009b, as illustrated in FIG. 10.

The order information 4009a includes information on whether to "newly create" update information 4008, or to "search for" the update information 4008 in the update information storage unit 409.

The date-and-time information 4009b is information of a date set to the update date-and-time 4008a of the update information 4008 to be newly created in a case of "newly create."

In a case of "search for," the date-and-time information 4009b is information to be used as a key to search for past update information 4008 in the update information storage unit 409.

A master key identifier 4010 is an identifier for the master key pair (the master public key 4001, the master secret key 4002) stored in the key generation apparatus 40.

The master key identifier 4010 is, for example, an ID, a hash value, an electronic certificate, etc.

The update information generation unit 408 generates the update information 4008.

The update information storage unit 409 stores the update information 4008 generated by the update information generation unit 408.

The update information acquisition unit 410 newly generates update information 4008 using the update information generation unit 408 in a case of "newly create" according to the order information 4009a of the update information acquisition request 4009 from the key update apparatus 70.

Further, in a case of "search for," the update information acquisition unit 410 searches the update information storage unit 409 for update information 4008 on or before the date and time specified by the date-and-time information 4009b of the update information acquisition request 4009, and acquires the update information 4008.

Furthermore, the update information acquisition unit 410 returns the update information 4008 generated, or the update information 4008 acquired, to the key update apparatus 70.

The master key update processing unit 411 receives the update information 4008 and the master key identifier 4010 from the key update apparatus 70.

Further, the master key update processing unit 411 retrieves the master key pair specified by the master key identifier 4010 from the master key storage unit 402, and updates the master key pair retrieved, using the update information 4008.

Furthermore, the master key update processing unit 411 stores again the master key pair after update in the master key storage unit 402.

Figure 6:
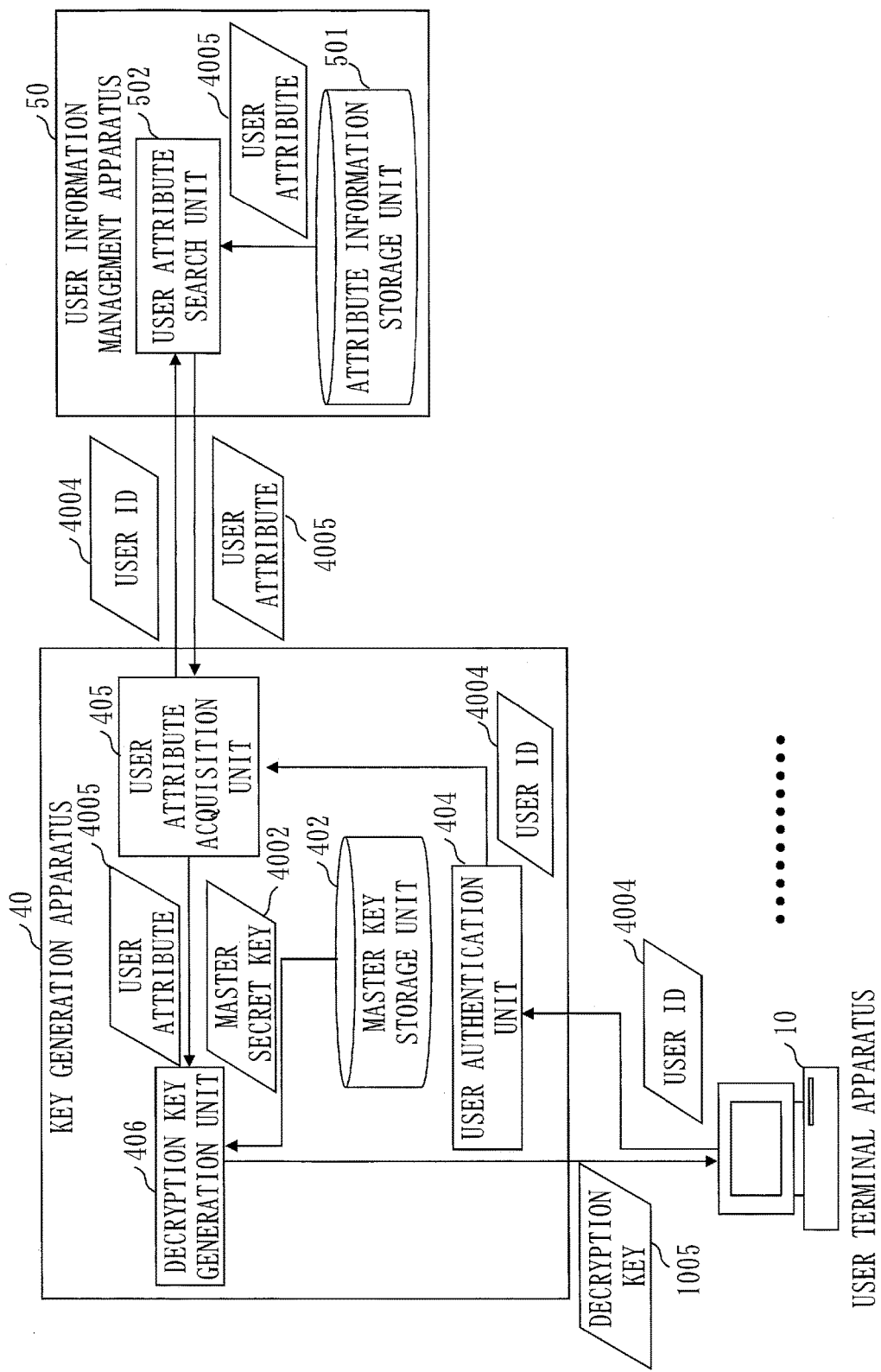
FIG. 6 is a diagram illustrating a configuration example of function modules in the key generation apparatus and a configuration example of function modules in a user information management apparatus according to the first embodiment.

The user information management apparatus 50 is an apparatus for managing organization information like a directory server, for example (FIG. 6).

An attribute information storage unit 501 stores attribute information (for example, full name, age, gender, department, section, post, etc.) of an organization and people belonging to an organization.

It is assumed that the attribute information of the organization is managed by the organization, and the user attributes 4005 of all the users are stored beforehand.

A user attribute search unit 502 acquires the user attribute 4005 from the attribute information storage unit 501 by taking a user ID 4004 as a key.

Figure 11:
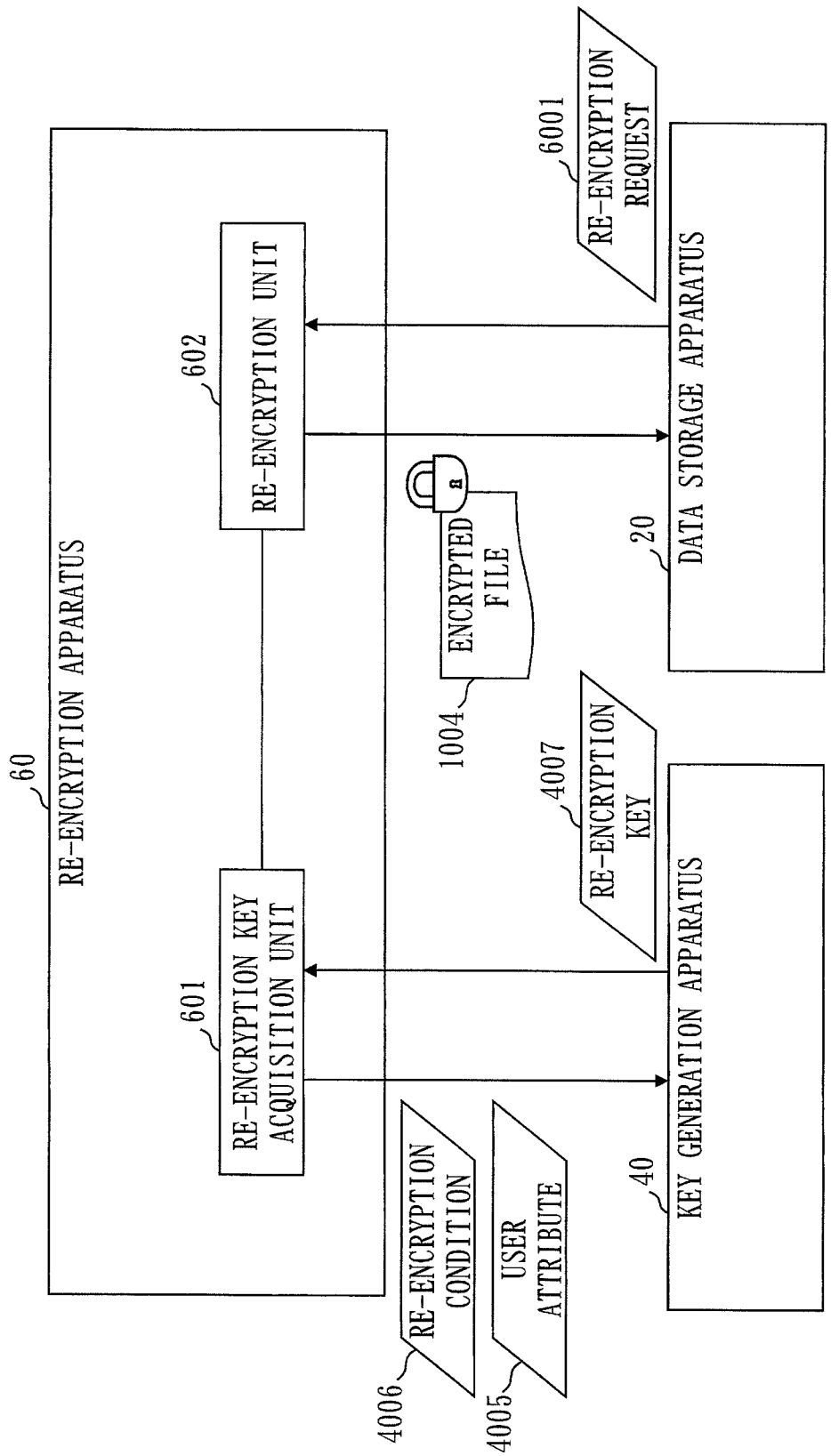
FIG. 11 is a diagram illustrating a configuration example of function modules in a re-encryption apparatus according to the first embodiment.

FIG. 11 illustrates a configuration example of function modules in the re-encryption apparatus 60.

Figure 12:
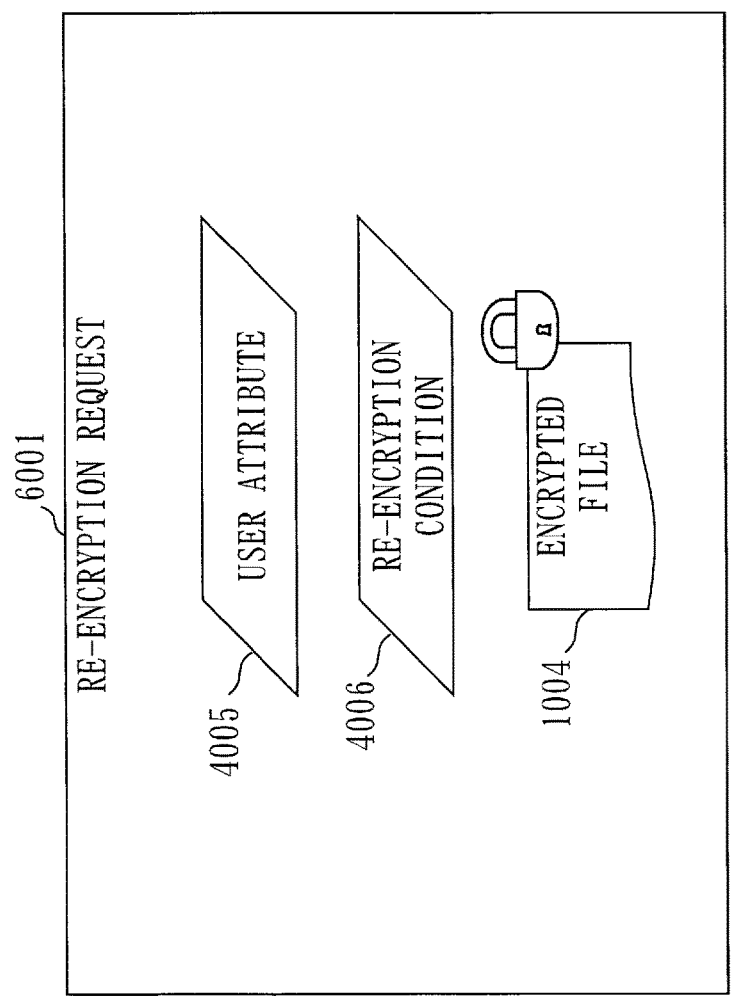
FIG. 12 is a diagram illustrating an example of a re-encryption request according to the first embodiment.

In a re-encryption request 6001, a user attribute 4005, a re-encryption condition 4006 and an encrypted file 1004 are stored, as illustrated in FIG. 12.

A re-encryption key acquisition unit 601 transmits a user attribute 4005 and a re-encryption condition 4006 to the key generation apparatus 40 and acquires a re-encryption key 4007 from the key generation apparatus 40.

A re-encryption unit 602 receives a re-encryption request 6001 from the data storage apparatus 20, and acquires the re-encryption key 4007 using the re-encryption key acquisition unit 601.

Further, the re-encryption unit 602 re-encrypts and returns the encrypted file 1004 included in the re-encryption request 6001, to the data storage apparatus 20.

Figure 13:
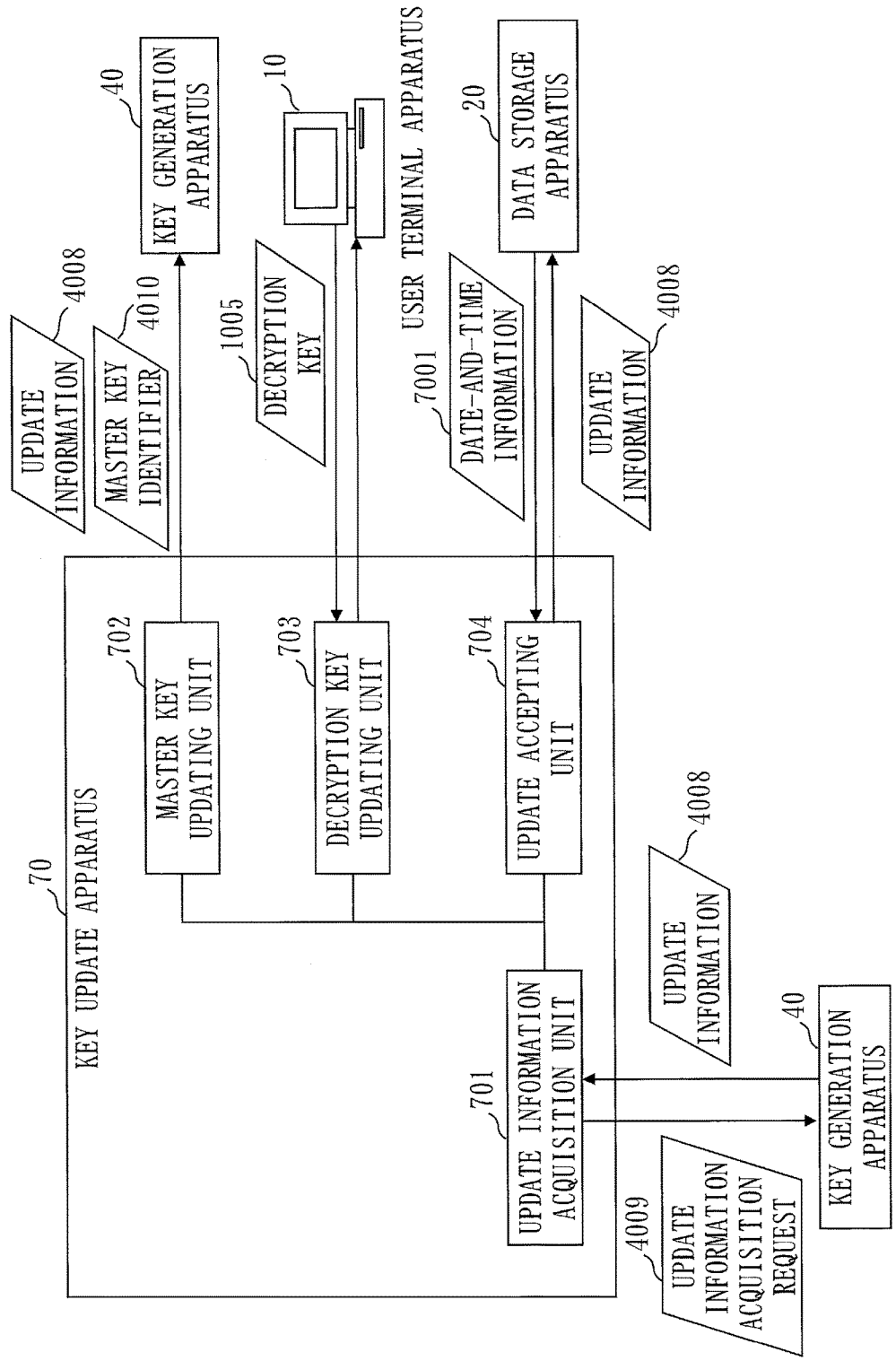
FIG. 13 is a diagram illustrating a configuration example of function modules in a key update apparatus according to the first embodiment.

FIG. 13 illustrates a configuration example of function modules in the key update apparatus 70.

An update information acquisition unit 701 transmits an update information acquisition request 4009 to the key generation apparatus 40, and acquires update information 4008 from the key generation apparatus 40.

A master key updating unit 702 transmits the update information 4008 acquired from the update information acquisition unit 701 and a master key identifier 4010 to the key generation apparatus 40, and makes the key generation apparatus 40 update the master public key 4001 and the master secret key 4002.

A decryption key updating unit 703 receives the decryption key 1005 from the user terminal apparatus 1005, and updates the decryption key 1005 using the update information 4008.

Date-and-time information 7001 is information to indicate a date and time, and information to specify update information 4008.

An update accepting unit 704 returns pertinent latest update information 4008 in the date-and-time information 7001 received from the data storage apparatus 20, to the data storage apparatus 20.

Here, it is safer to perform update of the encrypted files 1004 using the update information 4008 inside the key update apparatus 70 rather than by the data storage apparatus 20.

This is because the update information 4008 being put together with the master secret key 4002 before update has a same ability as a new master secret key 4002 after update.

Thus, it is preferable not to let the update information 4008 out of the key update apparatus 70.

Meanwhile, since a master secret key is secretly secured inside the key generation apparatus 40, even when the update information 4008 is transmitted to the data storage apparatus 20, the update information 4008 is extremely unlikely to be put together with the master secret key 4002.

Therefore, in the present embodiment, based on the idea that there is a large merit in updating the encrypted files 1004 by the data storage apparatus 20 alone (the merit that the data storage apparatus 20 can determine the update timing of the encrypted files), the update information 4008 is transmitted to the data storage apparatus 20, and the data storage apparatus 20 is made to update the encrypted files 1004.

Explanation of Operations

Next, the operations of the file encryption system 1 according to the present embodiment will be described.

FIG. 14 is a list of attribute types and attribute values used for representation of the user attributes 4005 supposed in the present embodiment.

A user attribute 4005 is represented in a form of [attribute type=attribute value], and is able to have a plurality of attributes in such a manner as "department=accounting department, section=budget section."

FIG. 15 is a list of users supposed in the present embodiment.

User attributes are assigned to each respective user.

If there is no relevant attribute, a NULL symbol is made to be an attribute value.

It is assumed that the information exemplified in FIG. 15 is stored in the user information management apparatus 50 beforehand.

<Distribution of Public Parameter and Decryption Key>

An example of a method to distribute the public parameter 1003 and the decryption keys 1005 to the user terminal apparatuses will be described.

Generation and distribution of the public parameter 1003 and the decryption keys 1005 may be performed at the time of initial setting when the file encryption system 1 is introduced.

Meanwhile, generation and distribution of the public parameter 1003 and the decryption keys 1005 may be performed at the time when the public parameter 1003 and the decryption keys 1005 become necessary in encryption processing and decryption processing.

In the file encryption system 1, the functional encryption scheme is used.

In the functional encryption scheme, the master key generation unit 401 (FIG. 5) generates a master-key pair first.

While the master-key pair may be prepared one pair for each file encryption system 1, the master key generation unit 401 may generate master-key pairs for a plurality of file encryption systems 1.

In such a case, association is made for which file encryption system 1 to correspond to which master-key pair.

Then, the decryption key generation unit 406 (FIG. 6) generates the decryption keys 1005 (these are called user secret keys in the functional encryption) from the user attributes 4005 and the master secret key 4002.

Figure 16:
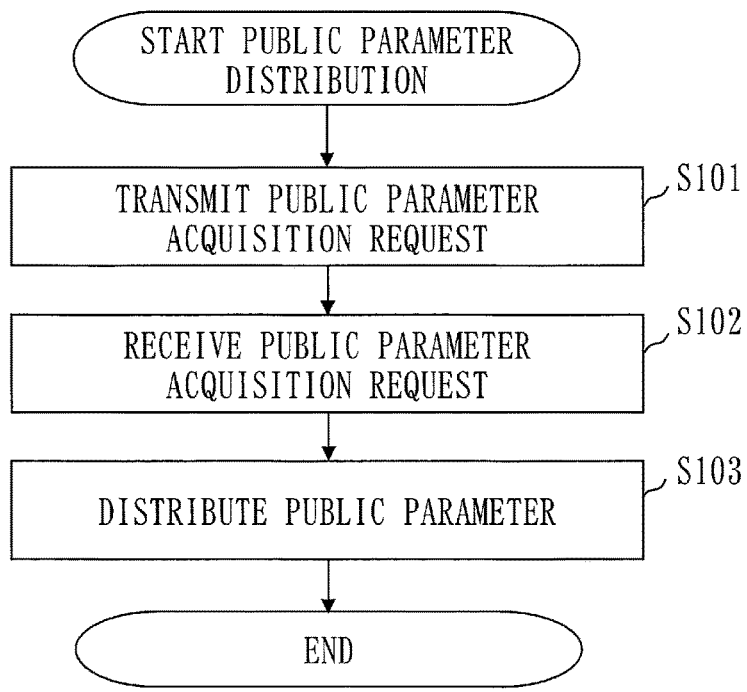
FIG. 16 is a flowchart diagram illustrating an example of distribution processing of a public parameter according to the first embodiment.

FIG. 16 is a flowchart illustrating distribution processing of the public parameter 1003.

Figure 5:
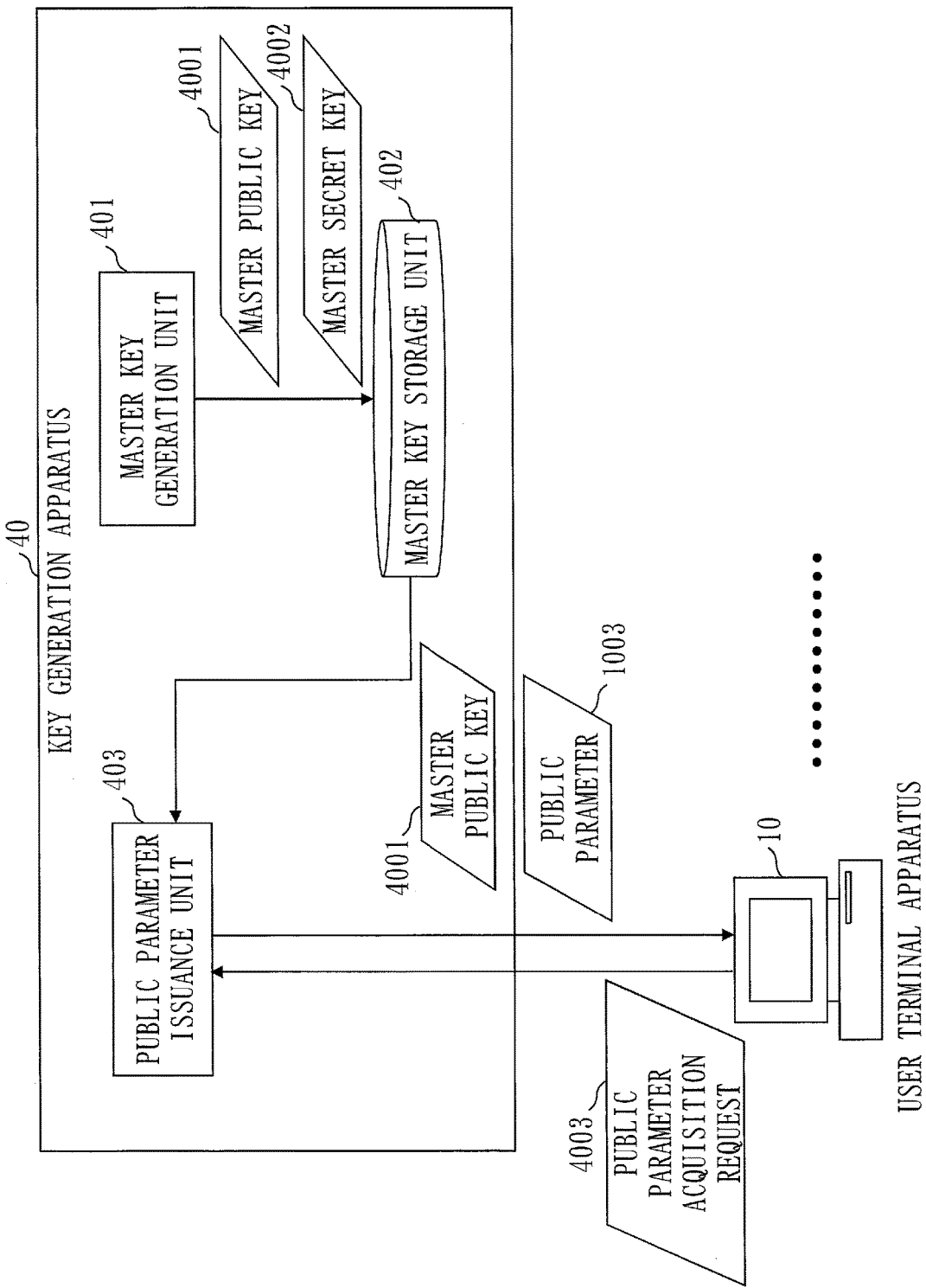
FIG. 5 is a diagram illustrating a configuration example of function modules in a key generation apparatus according to the first embodiment.

The procedure illustrated in FIG. 16 corresponds to FIG. 5.

First, in a step S101, a user terminal apparatus 10 transmits a public parameter acquisition request 4003 to the public parameter issuance unit 403 in the key generation apparatus 40.

Next, in a step S102, the public parameter issuance unit 403 in the key generation apparatus 40 receives the public parameter acquisition request 400.

Further, the public parameter issuance unit 403 retrieves a master public key 4001 corresponding to the public parameter acquisition request 4003 that has been received from the user terminal apparatus 10, from the master key storage unit 402.

Further, in a step S103, the public parameter issuance unit 403 generates the public parameter 1003 by applying a digital signature to the master public key 4001, and returns the public parameter 1003 to the user terminal apparatus 10.

A series of these operations are, in a case of using HTTP, for example, operations of downloading the public parameter 1003 to the user terminal apparatus 10 when a public parameter acquisition URL is accessed from the user terminal apparatus 10.

Figure 17:
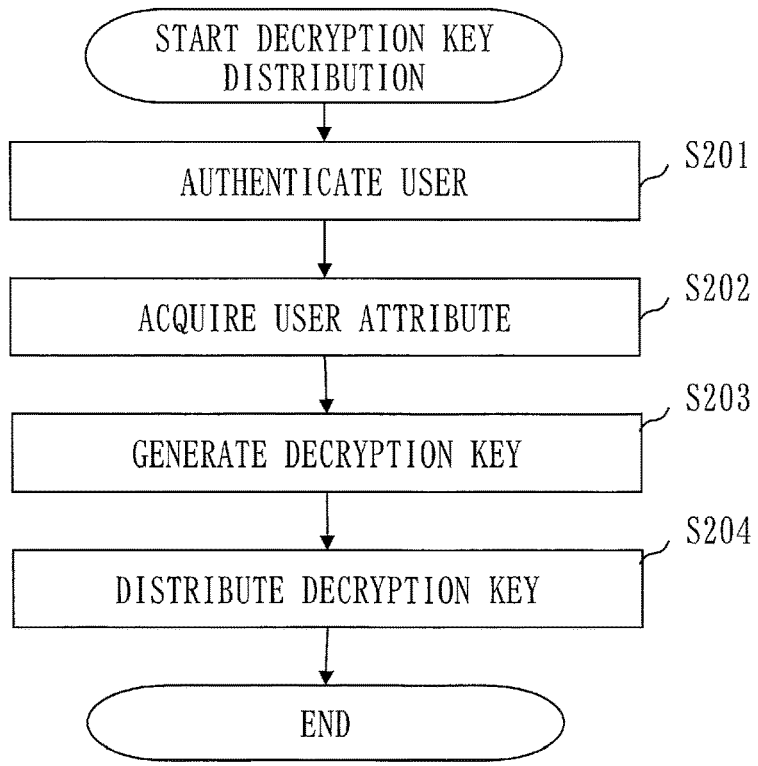
FIG. 17 is a flowchart diagram illustrating an example of distribution processing of a decryption key according to the first embodiment.

FIG. 17 is a flowchart illustrating distribution processing of the decryption keys 1005.

The procedure described in FIG. 17 corresponds to FIG. 6.

First, in a step S201, the user authentication unit 404 in the key generation apparatus 40 performs user authentication.

Specifically, a user terminal apparatus 10 transmits a user ID 4004 to the key generation apparatus 40, first.

Next, the user authentication unit 404 in the key generation apparatus 40 receives the user ID 4004.

Then, the user authentication unit 404 verifies identity of a user who has transmitted the user ID 4004.

The verification method may be use of an electronic certificate, or use of a password.

The user authentication unit 404 transfers the user ID 4004 to the user attribute acquisition unit 405 if authentication of the user ID 4004 succeeds.

Next, in a step S202, the user attribute acquisition unit 405 in the key generation apparatus 40 acquires a user attribute.

Specifically, the user attribute acquisition unit 405 in the key generation apparatus 40 transmits the user ID 4004 to the user attribute search unit 502 in the user information management apparatus 50.

Next, the user attribute search unit 502 searches for a user attribute 4005 corresponding to the user ID 4004 taking the received user ID 4004 as a key, in the attribute information storage unit 501.

Then, the user attribute search unit 502 returns the user attribute 4005 acquired to the user attribute acquisition unit 405 in the key generation apparatus 40.

The information indicated in FIG. 18 is stored in the user information management apparatus 50, for example.

When the user information management apparatus 50 receives "1003" from the key generation apparatus 40 as the user ID 4004, the user attribute search unit 502 in the user information management apparatus 50 returns a user attribute 4005 of "user ID=1003, name=Kenichi Suzuki, department=accounting department, section=NULL, post=department manager" to the user attribute acquisition unit 405 in the key generation apparatus 40.

The user attribute acquisition unit 405 transfers the user attribute 4005 acquired from the user information management apparatus 50 to the decryption key generation unit 406.

Next, in a step S203, the decryption key generation unit 406 in the key generation apparatus 40 generates a decryption key 1005 from the user attribute 4005 acquired from the user information management apparatus 50 and the master secret key 4002 stored in the master key storage unit 402.

Finally, in a step S204, the decryption key generation unit 406 in the key generation apparatus 40 returns the decryption key 1005 generated, to the user terminal apparatus 10.

Now, while an example is described here wherein the user terminal apparatus 10 acquires the decryption key 1005 from the key generation apparatus 40, the administrator of the file encryption system 1 may generate the decryption keys 1005 of all the users collectively by using the key generation apparatus 40, and distribute the decryption keys 1005 of all the users.

<Encryption Processing>

Next, encryption processing of data in the present embodiment will be described.

Figure 19:
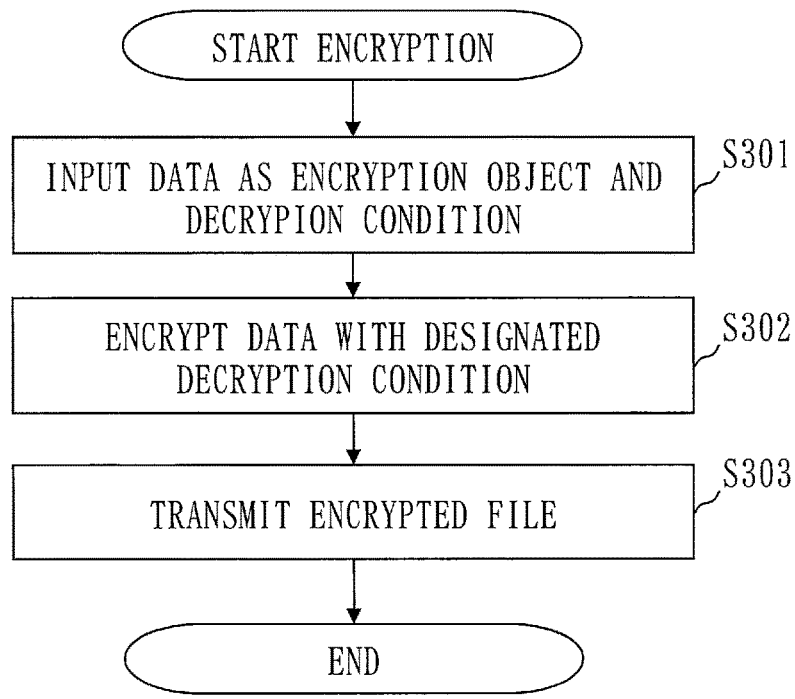
FIG. 19 is a flowchart diagram illustrating an example of encryption processing according to the first embodiment.

FIG. 19 is a flowchart illustrating encryption processing of data.

The procedure illustrated in FIG. 19 corresponds to FIG. 2.

First, in a step S301, a user designates data 1001 as an encryption object and a decryption condition 1002 using the file input unit 101 in the user terminal apparatus 10.

The decryption condition 1002 may be designated, for example, in a text format by a user, or may be designated beforehand.

The file input unit 101 transfers the data 1001 and the decryption condition 1002 input by the user, to the encryption unit 102.

Next, in a step S302, the encryption unit 102 encrypts the data 1001 with the decryption condition 1002 designated by the user.

Specifically, the encryption unit 102 retrieves the public parameter 1003 stored in the key storage unit 103.

Further, the encryption unit 102 encrypts the data 1001 so that a user who matches the decryption condition 1002 can decrypt the data 1001 with the decryption condition 1002, and the public parameter 1003 retrieved from the key storage unit 103.

Additionally, the encryption unit 102 generates an encrypted file 1004 from the encrypted data 1021, which is the data 1001 that has been encrypted, and the decryption condition 1002.

Then, the encryption unit 102 transfers the encrypted file 1004 generated to the encrypted data transmitting unit 104.

Next, in a step S303, the encrypted data transmitting unit 104 transmits the encrypted file 1004 to the data storage apparatus 20.

The data storage apparatus 20 receives the encrypted file 1004 at the encrypted data receiving unit 201.

The encrypted data receiving unit 201 transfers the encrypted file 1004 received to the data storage unit 202.

The data storage unit 202 stores the encrypted file 1004.

<Decryption Processing>

Next, decryption processing of a file in the present embodiment will be described.

Figure 20:
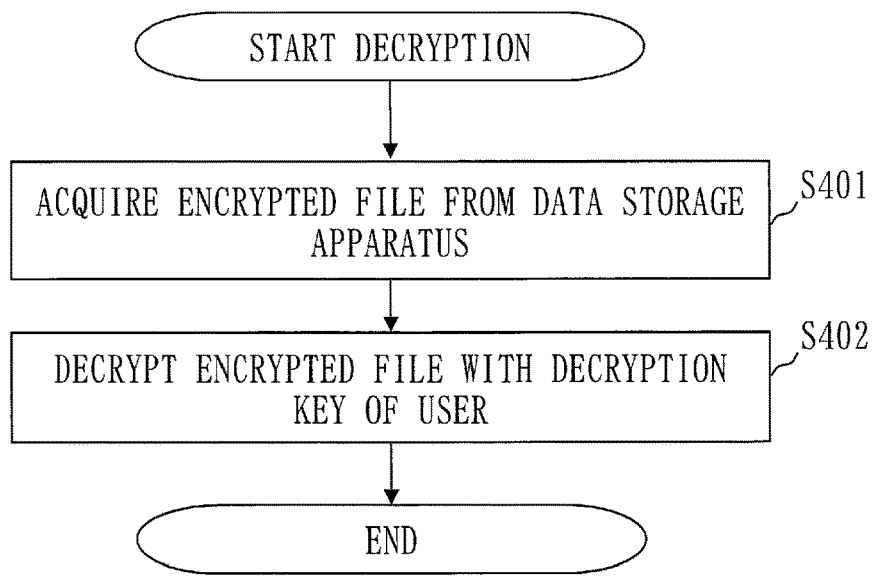
FIG. 20 is a flowchart diagram illustrating an example of decryption processing according to the first embodiment.

FIG. 20 is a flowchart illustrating decryption processing of the file.

The procedure illustrated in FIG. 20 corresponds to FIG. 2.

First, in a step S401, the encrypted data receiving unit 105 in the user terminal apparatus 10 acquires an encrypted file 1004 from the data storage apparatus 20.

Specifically, a user downloads the encrypted file 1004 which the user desires to decrypt from the data storage apparatus 20 first.

As a method to download the encrypted file 1004, a file sharing protocol such as Server Message Block (SMB) or Common Internet File System (CIFS) may be used, or a protocol being an extension of HTTP, such as Web-based Distributed Authoring and Versioning (WebDAV) may be used.

In the data storage apparatus 20, the encrypted data transmitting unit 203 retrieves the encrypted file 1004 from the data storage unit 202 according to a request from the user.

Then, the encrypted data transmitting unit 203 transmits the encrypted file 1004 to the user terminal apparatus 10.

In the user terminal apparatus 10, the encrypted data receiving unit 105 receives the encrypted file 1004, and transfers the encrypted file 1004 to the decryption unit 106.

Next, in a step S402, the decryption unit 106 in the user terminal apparatus 10 decrypts the encrypted file 1004 using a decryption key of the user.

Specifically, the decryption unit 106 retrieves a decryption key 1005 stored in the key storage unit 103.

Then, the decryption unit 106 decrypts the encrypted file 1004 received from the encrypted data receiving unit 105 using the decryption key 1005 retrieved.

If the user attribute 4005 of the decryption key 1005 matches the decryption condition 1002 set for the encrypted file 1004, the data 1001 is acquired as a decryption result.

If it does not match, decryption fails, and the user cannot acquire any information pertaining to the data 1001.

<Refresh Processing>

Next, refresh processing to handle deterioration of the cipher strength with age in the file encryption system 1 will be described.

Refresh processing is periodically performed at set intervals.

That is, every time periodical update timing arrives, updating of encrypted files is performed.

(1) Refresh Setting Processing

FIG. 21 is a flowchart illustrating a procedure for setting refresh intervals.

The procedure illustrated in FIG. 21 corresponds to FIG. 4.

First, in a step S501, the refresh setting input unit 204 in the data storage apparatus 20 receives refresh setting information 2002.

The refresh setting input unit 204 transfers the refresh setting information 2002 to the refresh processing unit 205.

The refresh setting information 2002 is composed of "refresh start date and time" and "refresh interval."

For example, when "refresh start date and time" is "Jan. 1, 2014," and "refresh interval" is "one year," refresh processing is performed every one year since Jan. 1, 2014.

Next, in a step S502, the refresh processing unit 205 records the contents of the refresh setting information 2002.

Lastly, in a step S503, the refresh processing unit 205 starts a timer (refresh timer) corresponding to the refresh setting information 2002 received.

The refresh timer is prepared for each piece of refresh setting information stored in the refresh processing unit 205.

(2) Refresh Processing

FIG. 22 is a flowchart illustrating a procedure of refresh processing.

By the refresh timer set in the refresh setting processing, refresh processing is performed periodically.

Here, in FIG. 22, processing procedures of a data processing method and a data processing program of the present application are reflected.

First, in a step S601, the refresh processing unit 205 in the data storage apparatus 20 deletes revocation information of a decryption condition for an encrypted file 1004, and performs re-encryption (FIG. 4).

Specifically, the refresh processing unit 205 retrieves the encrypted file 1004 wherein revocation information of "AND NOT ID=[ID of a revoked user]" is added to the decryption condition among the encrypted files 1004 stored in the data storage unit 202.

Then, the refresh processing unit 205 transfers the encrypted file 1004 retrieved to the revocation information removing unit 206.

The revocation information removing unit 206 removes the revocation information from the decryption condition 1002 while the encrypted file 1004 remains in an encrypted state (revocation information removing processing).

That is, the revocation information removing unit 206 retrieves the decryption condition 1002 from the header part 1004a of the encrypted file 1004, and removes the revocation information "AND NOT ID=[ID of a revoked user]" from the decryption condition 1002.

The decryption condition 1002 from which the revocation information has been removed becomes a re-encryption condition 4006.

For example, in a case of a decryption condition of "department=general affairs department AND section=general affairs section AND NOT ID=1001," "department=general affairs department AND section=general affairs section" becomes a re-encryption condition 4006.

Next, the revocation information removing unit 206 creates a re-encryption request 6001 (FIG. 12) from the re-encryption condition 4006, the encrypted file 1004 and user attribute 4005.

The user attribute 4005 may be an arbitrary attribute as long as the encrypted file 1004 as an object of re-encryption can be decrypted with such an attribute.

For example, when a decryption condition is "department=general affairs department AND section=general affairs section AND NOT ID=1001, "department=general affairs department, section=general affairs section" is assumed to be a user attribute 4005.

When creating processing of the user attribute 4005 is performed on the side of the re-encryption apparatus 60, the user attribute 4005 of the re-encryption request 6001 may be left blank.

Then, the revocation information removing unit 206 transmits the re-encryption request 6001 to the re-encryption apparatus 60 (FIG. 11).

Further, the revocation information removing unit 206 receives the encrypted file 1004 re-encrypted in the proxy re-encryption scheme (for example, Non-Patent Literature 2) from the re-encryption apparatus 60 (FIG. 11).

In the encrypted file 1004 that has been re-encrypted and received by the revocation information removing unit 206 from the re-encryption apparatus 60, the re-encryption condition 4006 is included in the header part 1004a, and encrypted data 1021 re-encrypted is included in the data part 1004b.

For example, when the re-encryption condition 4006 is "department=general affairs department AND section=general affairs section," the revocation information removing unit 206 receives the encrypted file 1004 including the decryption condition 1002 as "department=general affairs department AND section=general affairs section" in the header part 1004a, and including the encrypted data 1021 re-encrypted with the decryption condition "department=general affairs department AND section=general affairs section" in the data part 1004b.

An example of operations of the re-encryption apparatus 60 at the time of receiving a re-encryption request 6001 is as follows.

In the re-encryption apparatus 60, the re-encryption unit 602 receives a re-encryption request 6001 (FIG. 11).

Then, the re-encryption unit 602 transfers the re-encryption request 6001 to the re-encryption key acquisition unit 601.

Figure 7:
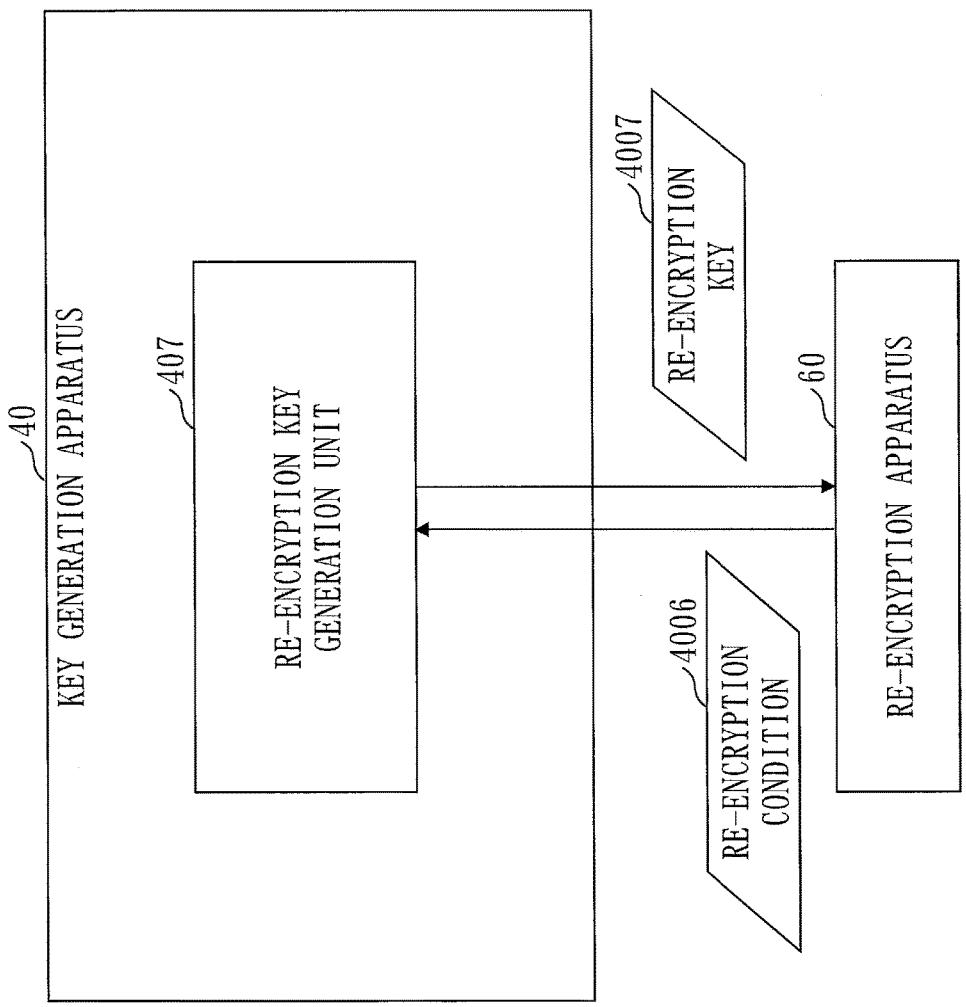
FIG. 7 is a diagram illustrating a configuration example of function modules in the key generation apparatus according to the first embodiment.

The re-encryption key acquisition unit 601 retrieves a re-encryption condition 4006 from the re-encryption request 6001, and transfers the re-encryption condition 4006 to the key generation apparatus 60 (FIG. 7).

In the key generation apparatus 40, the re-encryption key generation unit 407 receives the re-encryption condition 4006 and generates a re-encryption key 4007 (FIG. 7).

Then, the re-encryption key generation unit 407 transmits the re-encryption key 4007 to the re-encryption key acquisition unit 601 in the re-encryption apparatus 60 (FIG. 7).

The re-encryption key acquisition unit 601 receives the re-encryption key 4007, and transfers the re-encryption key 4007 to the re-encryption unit 602 (FIG. 11).

The re-encryption unit 602 re-encrypts encrypted data 1021 included in a data part 1004b of an encrypted file 1004, being included in the re-encryption request 6001 with the re-encryption key 4007 in the scheme of Non-Patent Literature 2 (FIG. 11).

Further, the re-encryption unit 602 stores the re-encryption condition 4006 in a header part 1004, and the encrypted data 1021 that has been re-encrypted in the data part 1004b, to generate an encrypted file 1004 newly re-encrypted (FIG. 11). Then, the re-encryption unit 602 transmits the encrypted file 1004 re-encrypted to the data storage apparatus 20 (FIG. 11).

Returning to the flow in FIG. 22, the refresh processing unit 205 updates a master key, decryption keys and all encrypted files in steps S602 through S605.

First, in the step S602, the key update apparatus 70 and the key generation apparatus 40 generate update information.

Specifically, the refresh processing unit 205 transmits date-and-time information 7001 for starting refresh to the key update apparatus 70 (FIG. 4 and FIG. 13).

In the key update apparatus 70, the update accepting unit 704 receives the date-and-time information 7001 (FIG. 13).

The update accepting unit 704 that has received the date-and-time information 7001 searches for whether update information 4008 at the current date and time is stored in the update information storage unit 409 in the key generation apparatus 40.

In particular, the update accepting unit 704 sets "search for" in order information 4009a of an update information acquisition request 4009, and creates the update information acquisition request 4009 in which the current date and time is set in date-and-time-information 4009b.

Figure 8:
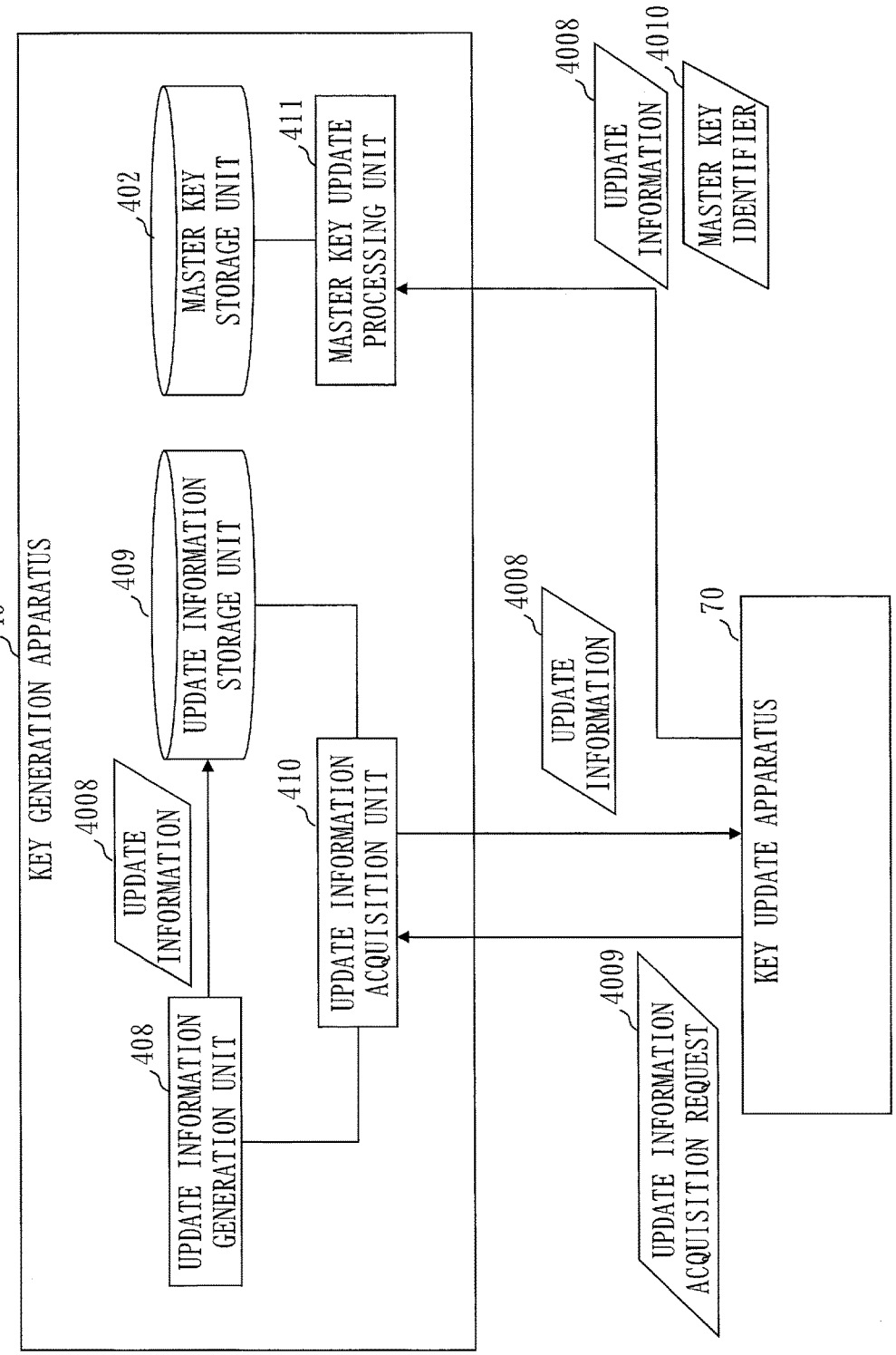
FIG. 8 is a diagram illustrating a configuration example of function modules in the key generation apparatus according to the first embodiment.

Then, the update accepting unit 704 transmits the update information acquisition request 4009 to the update information acquisition unit 410 via the update information acquisition unit 701 (FIG. 13 and FIG. 8).

The update information acquisition unit 410 searches for update information 4008 whose update date-and-time 4008a corresponds to the date-and-time information 4009b in the update information storage unit 409, and when there is corresponding update information 4008, returns the update information 4008 to the key update apparatus 70 (FIG. 8).

When the update information 4008 cannot be found, the update accepting unit 704 in the key update apparatus 70 sets "newly create" in order information 4009a of an update information acquisition request 4009, and creates the update information acquisition request 4009 in which the current date and time is set in the date-and-time information 4009b.

Then, the update accepting unit 704 transmits the update information acquisition request 4009 to the update information acquisition unit 410 via the update information acquisition unit 701 (FIG. 13 and FIG. 8).

The update information acquisition unit 410 generates update information 4008 by using the update information generation unit 408, stores the update information 4008 generated in the update information storage unit 409, and returns the update information 4008 generated to the update information acquisition unit 701 in the key update apparatus 70 (FIG. 8).

Further, the update information acquisition unit 701 transfers the update information 4008 to the update accepting unit 704, and the update accepting unit 704 returns the update information 4008 to the data storage apparatus 20 (FIG. 13).

Next, in a step S603, the key update apparatus 70 updates a master key.

Specifically, the master key updating unit 702 in the key update apparatus 70 transmits the update information 4008 generated in the step S602 and a master key-identifier 4010 to specify information of a master key currently used in the file encryption system 1 to the master key update processing unit 411 in the key generation apparatus 40 (FIG. 13 and FIG. 8).

The master key update processing unit 411 in the key generation apparatus 40 receives the update information 4008 and the master key identifier 4010.

Then, the master key update processing unit 411 retrieves a master key pair (a master public key 4001 and a master secret key 4002) specified by the master key identifier 4010 from the master key storage unit 402 (FIG. 8).

Further, the master key update processing unit 411 updates the master key pair using the update information data 4008b in the update information 4008 received (FIG. 8).

Now, although the example is presented here of transmitting the update information 4008 to the key generation apparatus 40 by the key update apparatus 70, the master key update processing unit 411 may retrieve the update information 4008 from the update information storage unit 409 and may update the master key pair.

Next, in a step S604, the decryption key updating unit 703 in the key update apparatus 70 updates decryption keys 1005 using the update information 4008 retrieved in the step S602 (FIG. 13).

Here, the decryption key updating unit 703 may assemble decryption keys 1005 to be updated from the user terminal apparatuses 10 beforehand, or may individually retrieve decryption keys 1005 for respective user terminal apparatuses 10 at update timing of each user terminal apparatus 10.

Next, in a step S605, the refresh processing unit 205 in the data storage apparatus 20 updates all the encrypted files 1004 stored in the data storage unit 202 using the update information 4008 retrieved in the step S602.

In the encrypted files 1004 updated in the step S605, the encrypted files 1004 whereof the revocation information has been removed from the decryption conditions 1002 and re-encrypted in the step S601 are included.

Here, the execution order of each step in FIG. 22 may be transposed.

For example, it may be executed in the order of S602→S603→S604→S601→S605.

Alternatively, it may be executed in the order of S602→S604→S603→S601→S605.

Further, it may be executed in the order of S602→S601→S605→S603→S604.

Besides, it may be executed in the order of S601→S602→S604→S603→S605.

Here, update of the master key in the step S603 is to change the contents of the master key by performing data conversion of the current master key using the update information 4008, and not to regenerate a master key.

Specifically, update of the master key is processing to convert components constituting the master key using the update information 4008b to be new components.

By performing update in this manner, the same effect as regeneration of a master key is obtained.

Further, update of the decryption keys in the step S604 is to change the contents of the decryption keys by performing data conversion of the current decryption keys using the update information 4008, and not to regenerate decryption keys.

Similarly, update of the encrypted files in the step S605 is to change the contents of the encrypted files by performing data conversion of the current encrypted files using the update information 4008, and not to regenerate encrypted files and re-encrypt the encrypted files.

Thus far is the explanation of the first embodiment.

Explanation of Effect

In the above-mentioned procedure, by performing conversion processing so that a master key and decryption keys are updated without being regenerated, and further, encrypted files can be decrypted with decryption keys updated while the encrypted files remain encrypted, there are effects that the cipher strength is prevented from being imperilled, and an encryption file system can be operated safely for the long period of time.

Further, since revocation information is removed from decryption conditions while the encrypted files remain in an encrypted state, and the encrypted files including the decryption conditions from which the revocation information has been removed are re-encrypted, it is possible to avoid deterioration of the cryptographic performance.

Second Embodiment

In the first embodiment, all the decryption keys 1005 are updated at the time of refresh processing.

The present embodiment describes an example of selecting decryption keys 1005 to be updated at the time of refresh processing, and updating only the selected decryption keys 1005.

According to the present embodiment, after the refresh processing is performed, encrypted files 1004 cannot be decrypted at all with decryption keys 1005 that have not been updated.

Accordingly, by not updating decryption keys 1005 intentionally, it is possible to realize revocation of the plurality of decryption keys 1005 collectively.

Explanation of Configuration

The configuration of a file encryption system 1 according to the present embodiment is the same as that described in the first embodiment.

Further, configuration examples of function modules in the user terminal apparatuses 10, the data storage apparatus 20, the key generation apparatus 40, the user information management apparatus 50 and the re-encryption apparatus 60 are the same as those described in the first embodiment.

In the present embodiment, only a configuration of function modules in the key update apparatus 70 is different from those of the first embodiment.

Figure 23:
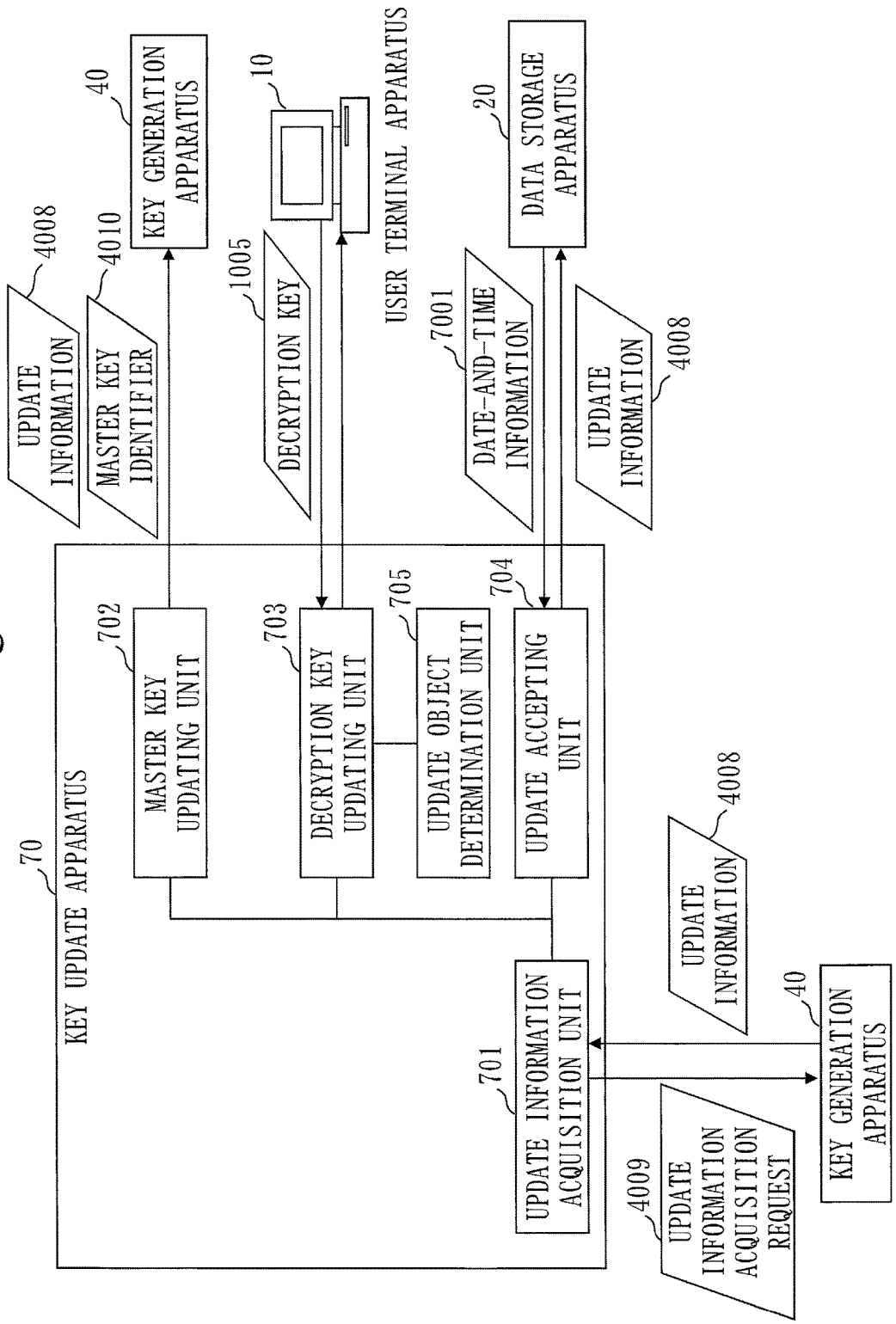
FIG. 23 is a diagram illustrating a configuration example of function modules in a key update apparatus according to a second embodiment.

FIG. 23 illustrates a configuration example of function modules in the key update apparatus 70 according to the present embodiment.

In the following, only the parts different from those in the first embodiment will be described.

An update object determination unit 705 determines whether or not to deem decryption conditions 1005 to be objects of update by the decryption key updating unit 703.

The update object determination unit 705 receives decryption keys 1005 from the decryption key updating unit 703, determines whether update of the decryption keys 1005 received is allowed, and returns information to denote a determination result to the decryption key updating unit 703.

The decryption key updating unit 703 updates only the decryption keys 1005 that have been determined as the objects of update by the update object determination unit 705.

The update object determination unit 705 retains information (hereinafter called update propriety information) to determine whether to allow update of every decryption key 1005.

The update propriety information is input by, for example, an administrator to manage the decryption keys 1005 (a key administrator or a system administrator), to the update object determination unit 705.

The decryption key updating unit 703 refers to the update propriety information, and selects decryption keys that should be made unusable, e.g. decryption keys that have leaked outside, or decryption keys that have been temporarily issued.

Here, the update object determination unit 705 may retain information to indicate decryption keys 1005 whereof update is not allowed in replacement of the update propriety information.

Explanation of Operation"

Next, an example of update processing of decryption conditions 1005 in the key update apparatus 70 at the time of refresh processing will be described.

Here, processing that is not explained in the present embodiment is the same as that in the first embodiment.

Figure 24:
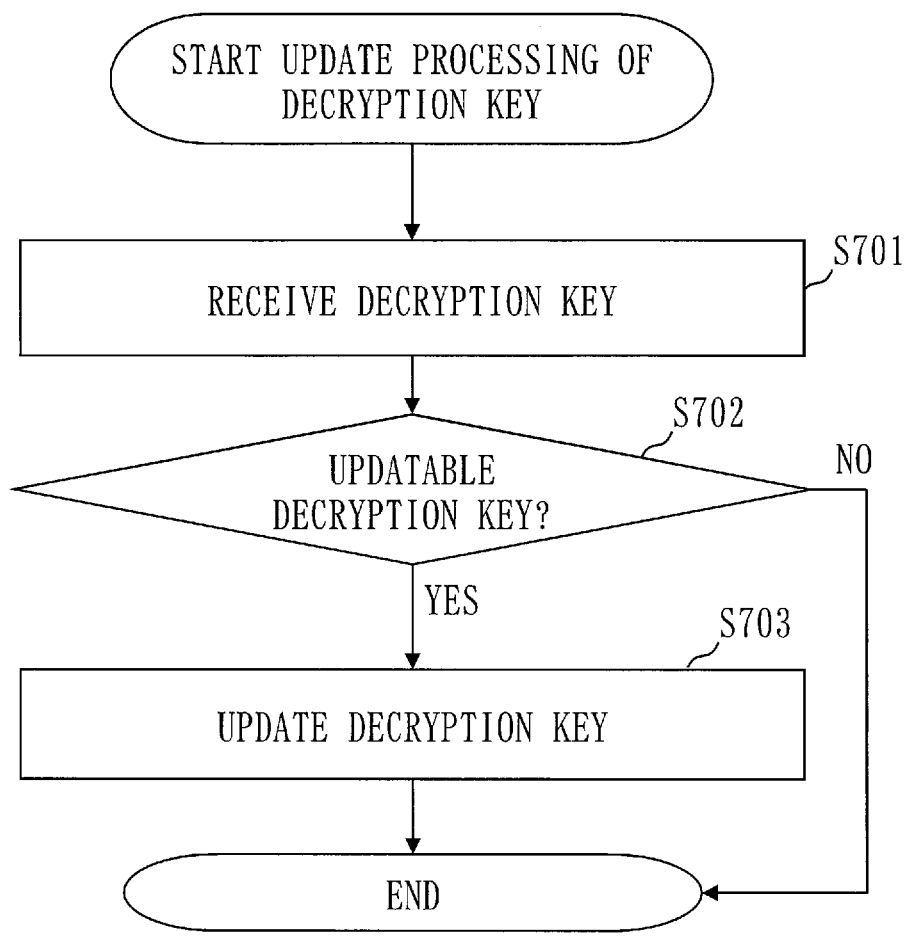
FIG. 24 is a flowchart diagram illustrating an example of update processing of a decryption key according to the second embodiment.

FIG. 24 is a flowchart illustrating an update procedure of the decryption keys 1005 according to the present embodiment.

First, in a step S701, when the decryption key updating unit 703 receives a decryption key 1005, the decryption key updating unit 703 transfers the decryption keys 1005 received to the update object determination unit 705, and makes an inquiry about whether update of such decryption keys 1005 is allowed.

Next, in a step S702, the update object determination unit 705 refers to the update propriety information to determine whether update of the decryption keys 1005 inquired is allowed, and returns the determination result to the decryption key updating unit 703.

When update of the decryption keys 1005 is allowed, in a step S703, the decryption key updating unit 703 updates the decryption keys 1005 using the update information 4008.

When update is not allowed, the procedure ends without any action.

Explanation of Effect

According to the procedure above, there is an effect that at the time of refresh processing, whether update of decryption keys is necessary or not is determined, and decryption keys that should not be updated can be revoked collectively.

Third Embodiment

In the first embodiment, it is assumed to update decryption keys collectively at the time of refresh processing.

However, in an actual operation environment, decryption keys of all the users may not be necessarily updated at the time of refresh processing due to temporary transfer, long-term business trips, etc. of users.

In the present embodiment, a method of applying update processing afterward to decryption keys that could not have been updated at the time of refresh processing.

Explanation of Configuration

The configuration of a file encryption system 1 according to the present embodiment is the same as that described in the first embodiment.

Further, configuration examples of function modules in the user terminal apparatuses 10, the data storage apparatus 20, the key generation apparatus 40, the user information management apparatus 50 and the re-encryption apparatus 60 are the same as those described in the first embodiment.

In the present embodiment, only the configuration of function modules in the key update apparatus 70 is different from that of the first embodiment.

Figure 25:
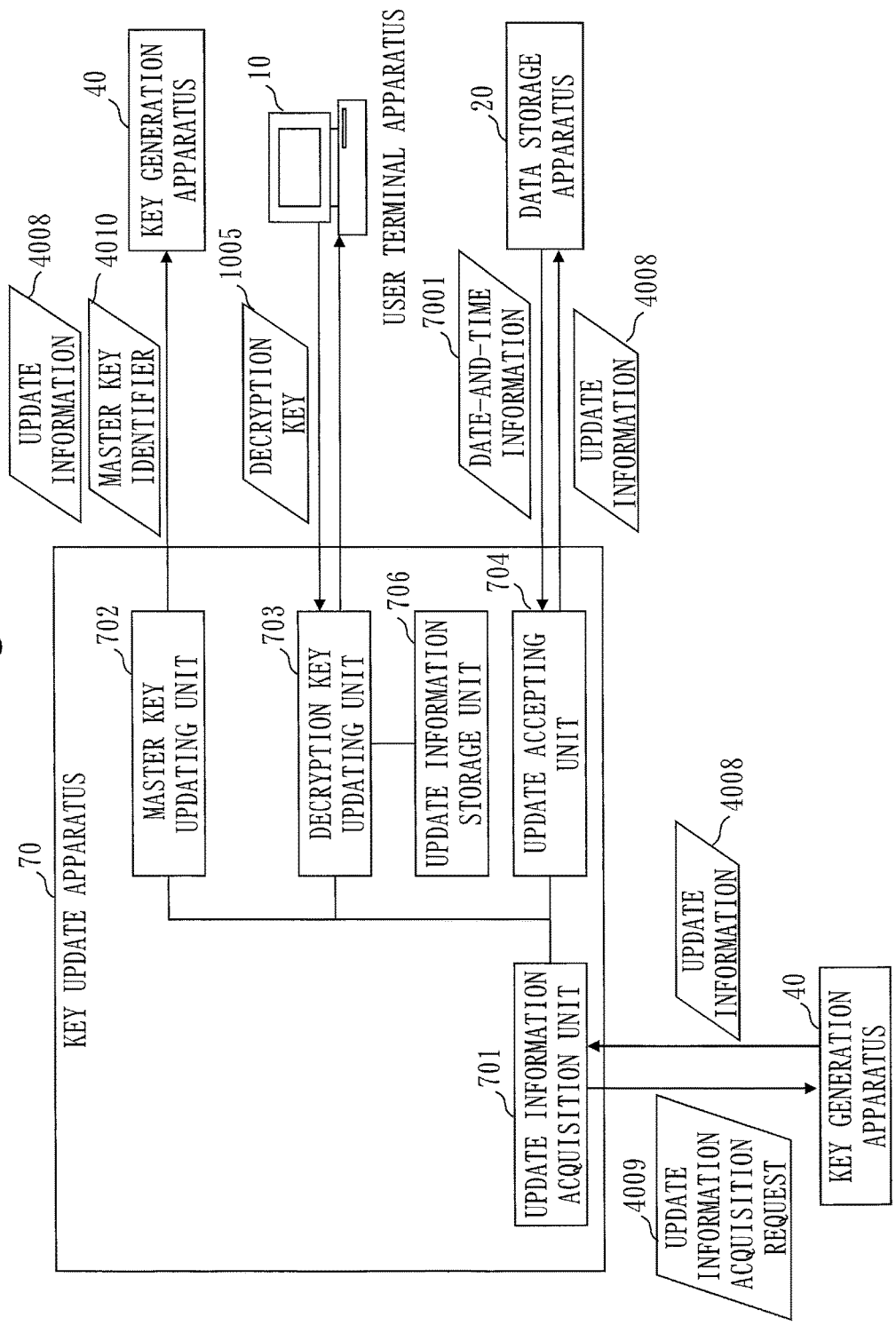
FIG. 25 is a diagram illustrating a configuration example of function modules in the key update apparatus according to a third embodiment.

FIG. 25 describes a configuration example of function modules of the key update apparatus 70 according to the present embodiment.

In the following, only the functions different from those in the first embodiment will be described.

Figure 26:
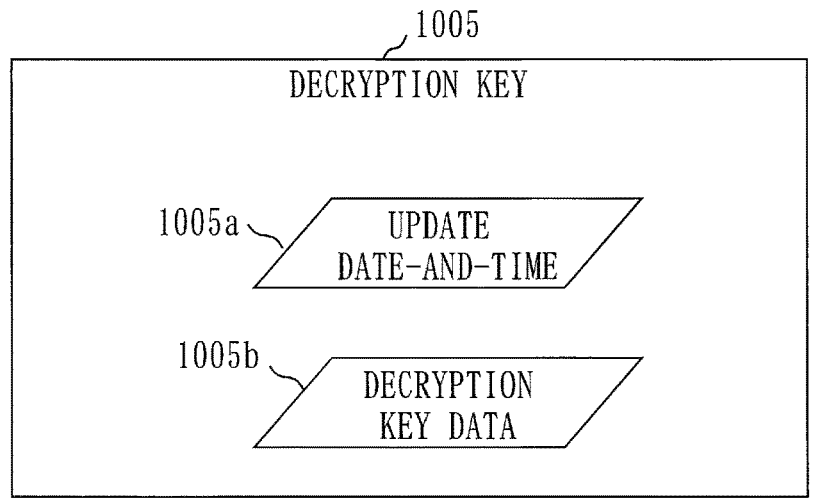
FIG. 26 is a diagram illustrating an example of a decryption key according to the third embodiment.

A decryption key 1005 is composed of an update date-and-time 1005*a* and decryption key data 1005*b*, as illustrated in FIG. 26.

The update date-and-time 1005*a* is a date and time when the last update of the decryption key 1005 has been performed.

The decryption key data 1005*b* is data corresponding to the decryption key 1005 in the first embodiment.

In the update information storage unit 706, history information that indicates a history of refresh processing performed by the decryption key updating unit 703 is stored.

The history information is, for example, date-and-time information 7001 received from the data storage apparatus 20 at the time of refresh processing.

In the present embodiment, when receiving a decryption key 1005, the decryption key updating unit 703 selects update information 4008 to be used for updating the decryption key 1005 in accordance with the date and time when the last update of the decryption key 1005 has been performed, and updates the decryption key using the update information 4008 selected.

More specifically, the decryption key updating unit 703 examines whether update information 4008 that has not been applied to the decryption key 1005 exists among the update information 4008 used at the time of refresh processing in the past, based on the update date-and-time 1005*a* of the decryption key 1005.

When the update information 4008 that has not been applied to the decryption key 1005 does not exist, the decryption key updating unit 703 selects only the latest update information 4008, and updates the decryption key 1005 using the latest update information 4008.

Meanwhile, when the past update information 4008 that has not been applied to the decryption key 1005 exist, the decryption key updating unit 703 selects the past update information 4008 that has not been applied to the decryption key 1005 and the latest update information 4008, and updates the decryption key 1005 using these update information 4008.

Explanation of Operation

Next, an update operation of a decryption key 1005 according to the present embodiment will be described.

Here, processing that is not described in the present embodiment is the same as that in the first embodiment.

Figure 27:
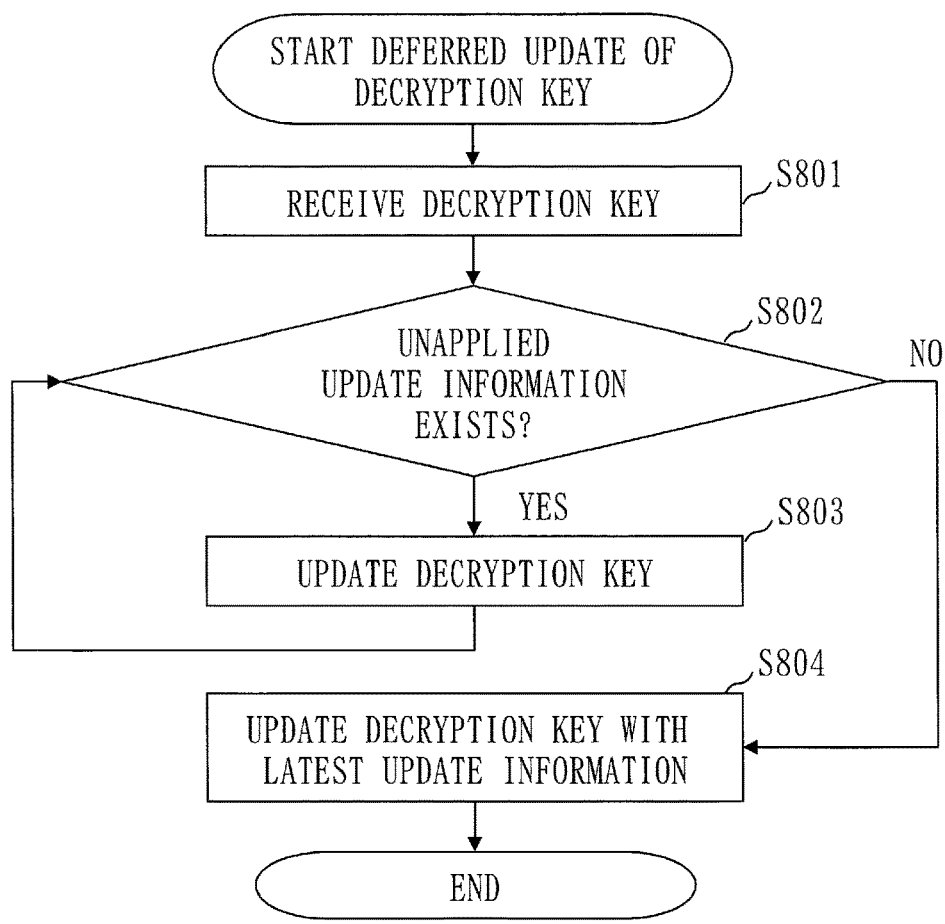
FIG. 27 is a flowchart diagram illustrating an example of deferred update processing of a decryption key according to the third embodiment.

FIG. 27 is a flowchart illustrating the update operation of the decryption key 1005 according to the present embodiment.

First, in a step S801, the decryption key updating unit 703 receives a decryption key 1005.

Next, in a step S802, the decryption key updating unit 703 makes an inquiry to the update information storage unit 706 about whether there exists update information 4008 that has not been applied to the decryption key 1005.

Specifically, the decryption key updating unit 703 retrieves an update date-and-time 1005*a* from the decryption key 1005 received.

Then, the decryption key updating unit 703 transfers the update date-and-time 1005*a* retrieved to the update information storage unit 706, and makes an inquiry to the update information storage unit 706 about whether there exists update information 4008 that has not been applied to the decryption key 1005.

The update information storage unit 706 returns a list of update dates and times (date-and-time information 7001) to the decryption key updating unit 703 when there exists a record that refresh processing (update processing) has been performed on or after the update date-and-time 1005*a* in the history information.

The decryption key updating unit 703 receives the list of update dates and times from the update information storage unit 706, and when the list of update dates and times is not blank (YES in the step S802), retrieves update information 4008 corresponding to the update dates and times in the list in chronological order of the update dates and times, using the update information acquisition unit 701.

Then, the decryption key updating unit 703 updates the decryption key 1005 in sequence by applying the update information 4008 retrieved in chronological order of the update dates and times (S803).

Then, when the update information 4008 that has not been applied to the decryption key 1005 does not exist (NO in the step S802), the decryption key updating unit 703 updates the decryption key 1005 with the latest update information 4008 (step S804).

The case in which it is NO in the step S802 is a case wherein the update information 4008 that has not been applied to the decryption key 1005 does not exist because the decryption key 1005 has been updated at the last refresh processing, or a case wherein the update information 4008 that has not been applied to the decryption key 1005 exists and application of the update information 4008 corresponding to all the update dates and times in the list, to the decryption key 1005 is completed.

A case wherein refresh processing is performed once a year, for example, on January 1, is assumed.

Further, it is assumed that it is Jan. 1, 2015 at the present.

When an update date-and-time 1005a of a decryption key 1005 received by the decryption key updating unit 703 is, for example, Jan. 1, 2012, update by the refresh processing of Jan. 1, 2013 and the refresh processing of Jan. 1, 2014 are not performed to the decryption key 1005.

Therefore, the decryption key updating unit 703 updates the decryption key 1005 using the update information 4008 as of Jan. 1, 2013 and the update information 4008 as of Jan. 1, 2014, in the step S803.

Further, the decryption key updating unit 703 updates the decryption key 1005 using the update information 4008 as of Jan. 1, 2015, in the step S804.

Explanation of Effect

According to the procedure above, the latest update processing can be also applied to a decryption key that has not been updated at the time of refresh processing in the past, and there is an effect that it is possible to deal with a case as well wherein a decryption key could not have been updated over a lengthy period by a secondee or a person on a long-term business trip.

In the above, the embodiments of the present invention are described; however, two or more of the embodiments may be implemented in combination.

Otherwise, one of the embodiments may be partially implemented.

Meanwhile, two or more of the embodiments may be partially implemented in combination.

Here, the present invention is not limited to these embodiments, but can be altered in a various manner as needed.

Lastly, an example of a hardware configuration of the data storage apparatus 20 will be described with reference to FIG. 28.

The data storage apparatus 20 is a computer.

The data storage apparatus 20 is equipped with hardware such as a processor 901, an auxiliary storage device 902, a memory 903, a communication device 904, an input interface 905 and a display interface 906, etc.

The processor 901 is connected to other hardware via a signal line 910 to control these other hardware.

The input interface 905 is connected to an input device 907.

The display interface 906 is connected to a display 908.

The processor 901 is an IC (Integrated Circuit) that performs processing.

The processor 901 is, for example, a CPU (Central Processing Unit), a DSP (Digital Signal Processor), or a GPU (Graphics Processing Unit).

The auxiliary storage device 902 is, for example, a ROM (Read Only Memory), a flash memory, or an HDD (Hard Disk Drive).

The memory 903 is, for example, a RAM (Random Access Memory).

The communication device 904 includes a receiver 9041 to receive data and a transmitter 9042 to transmit data.

The communication device 904 is, for example, a communication chip or an NIC (Network Interface Card).

The input interface 905 is a port whereto a cable 911 of the input device 907 is connected.

The input interface 905 is, for example, a USB (Universal Serial Bus) terminal. The display interface 906 is a port whereto a cable 912 of the display 908 is connected.

The display interface 906 is, for example, a USB terminal or an HDMI (registered trademark) (High Definition Multimedia Interface) terminal.

The input device 907 is, for example, a mouse, a keyboard, or a touch panel.

The display 908 is, for example, an LCD (Liquid Crystal Display).

In the auxiliary storage device 902, programs to realize the functions of the encrypted data receiving unit 201, the encrypted data transmitting unit 203, the refresh setting input unit 204, the refresh processing unit 205 and the revocation information removing unit 206 as illustrated in FIG. 4 (hereinafter, the encrypted data receiving unit 201, the encrypted data transmitting unit 203, the refresh setting input unit 204, the refresh processing unit 205 and the revocation information removing unit 206 are collectively referred to as "units") are stored.

The programs are loaded into the memory 903, read into the processor 901, and executed by the processor 901.

Further, an OS (operating system) is stored in the auxiliary storage device 902.

Then, at least a part of the OS is loaded into the memory 903, and the processor 901 executes the programs to realize the functions of the "units" while executing the OS.

Figure 28:
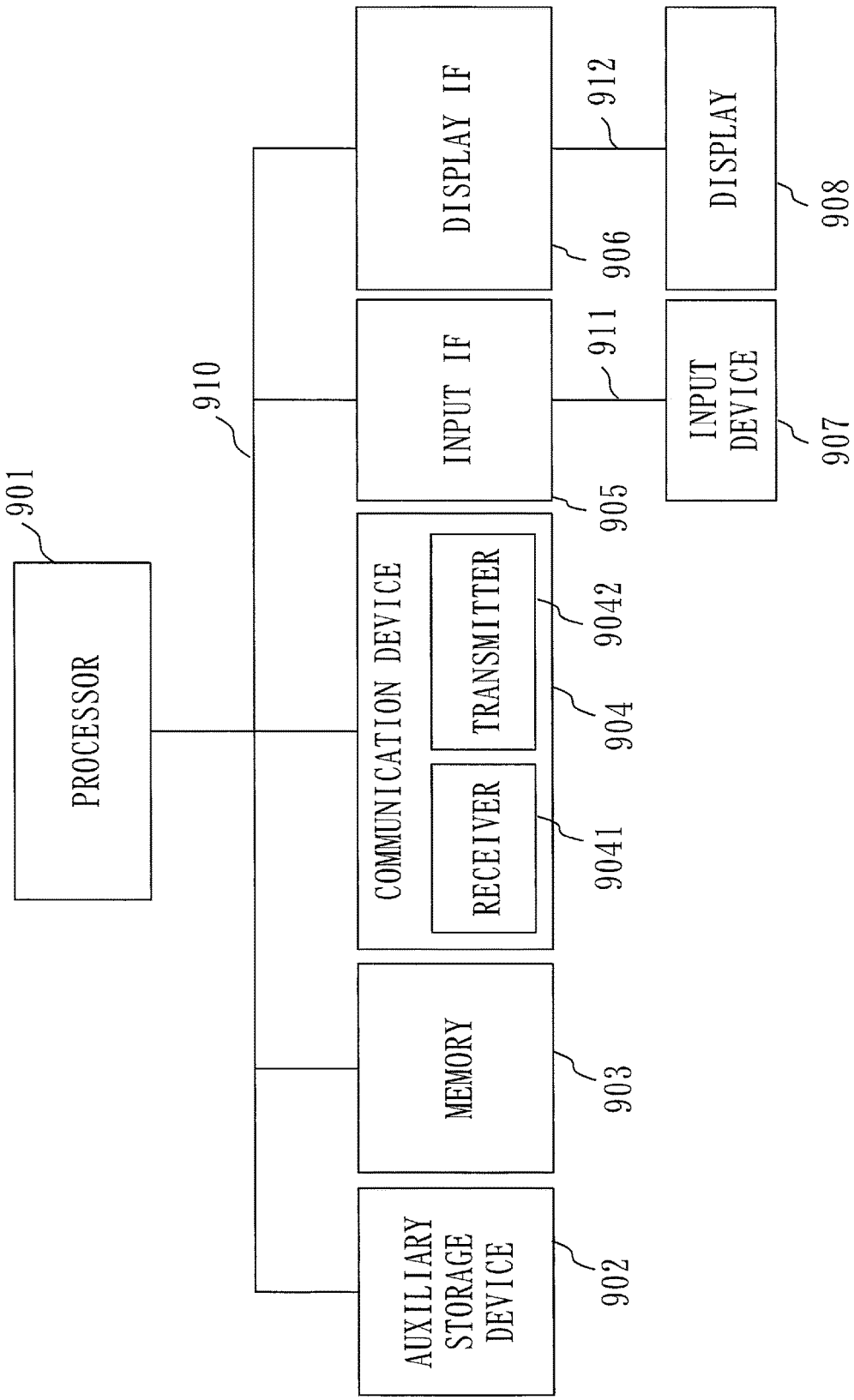
FIG. 28 is a diagram illustrating an example of a hardware configuration of a data storage apparatus according to the first through third embodiments.

In FIG. 28, one processor 901 is illustrated; however, the data storage device 20 may be equipped with a plurality of processors 901.

Then, the plurality of processors 901 may execute the programs to realize the functions of the "units" cooperatively.

Additionally, information, data, signal values or variable values indicating the results of the processing by the "units" are stored in the memory 903, the auxiliary storage device 902, or a register or a cache memory in the processor 901.

The "units" may be provided by "circuitry".

Further, the "units" may be replaced with "circuits," "steps," "procedures" or "processing."

The "circuits" and "circuitry" are concepts including not only the processor 901 but also processing circuits of other types, such as a logic IC, a GA (Gate Array), an ASIC (Application Specific Integrated Circuit) and an FPGA (Field-Programmable Gate Array).

REFERENCE SIGNS LIST

1: file encryption system; 10: user terminal apparatus; 20: data storage apparatus; 30: network; 40: key generation apparatus; 50: user information management apparatus; 60: re-encryption apparatus; 70: key update apparatus; 80: data updating system; 101: file input unit; 102 encryption unit; 103: key storage unit; 104: encrypted data transmitting unit; 105: encrypted data receiving unit; 106: decryption unit; 201: encrypted data receiving unit; 202: data storage unit; 203: encrypted data transmitting unit; 204: refresh setting input unit; 205: refresh processing unit; 206: revocation information removing unit; 401: master key generation unit; 402: master key storage unit; 403: public parameter issuance unit; 404: user authentication unit; 405: user attribute acquisition unit; 406: decryption key generation unit; 407: reencryption key generation unit; 408: update information generation unit; 409 update information storage unit; 410 update information acquisition unit; 411: master key update processing unit; 501: attribute information storage unit; 502: user attribute search unit; 601: re-encryption key acquisition unit; 602: re-encryption unit; 701: update information acquisition unit; 702: master key updating unit; 703: decryption key updating unit; 704: update accepting unit; 705: update object determination unit; 706: update information storage unit; 1001: data; 1002: decryption condition; 1003: public parameter; 1004: encrypted file; 1005: decryption key; 1021: encrypted data; 2002: refresh setting information; 4001: master public key; 4002: master secret key; 4003: public parameter acquisition request; 4004: user ID; 4005: user attribute, 4006: re-encryption condition; 4007: re-encryption key; 4008: update information; 4009: update information acquisition request; 4010: master key identifier; 6001: re-encryption request; 7001: date-and-time information

The invention claimed is:

1. A data storage apparatus comprising processing circuitry to:
store encrypted data that has been encrypted, while remaining in an encrypted state, and to store a decryption condition being a parameter to control permitted decryption of the encrypted data, where a decryption-permission user who is permitted to decrypt the encrypted data is defined in the decryption condition that does not require decryption of said encrypted data in order to read;
in a case where revocation information which identifies a revoked user who is no longer the decryption-permission user, has been added to the decryption condition when update timing to update the encrypted data and the decryption condition arrives, process the revocation information to remove the revoked user from the decryption condition while the encrypted data remains in an encrypted state, to transmit the encrypted data and the decryption condition from which the revocation information has been removed, to a re-encryption apparatus that performs re-encryption in a proxy re-encryption scheme, the transmission to the re-encryption apparatus being performed prior to decryption, and to receive from the re-encryption apparatus, the encrypted data that has been re-encrypted in the proxy re-encryption scheme using the decryption condition from which the revocation information has been removed; and
update the encrypted data that has been re-encrypted and received, and the decryption condition from which the revocation information has been removed.

2. The data storage apparatus as defined in claim 1, wherein the processing circuitry
updates the encrypted data that has been re-encrypted and received, and the decryption condition from which the revocation information has been removed, using update information used for update of a master public key being a master key of an encryption key used for encryption of the encrypted data, and a master secret key being a master key of a decryption key used for decryption of the encrypted data, and for update of the decryption key.

3. The data storage apparatus as defined in claim 2, wherein the processing circuitry
updates the encrypted data that has been re-encrypted and received, and the decryption condition from which the revocation information has been removed, using update information that is generated for updating the master public key and the master secret key by a key generation apparatus that updates the master public key and the master secret key.

4. A data updating system comprising:
a data storage apparatus including;
first processing circuitry to
store encrypted data which has been encrypted, while remaining in an encrypted state, and to store a decryption condition being a parameter to control permitted decryption of the encrypted data, where a decryption-permission user who is permitted to decrypt the encrypted data is defined in the decryption condition that does not require decryption of said encrypted data in order to read,
determine, when update timing to update the encrypted data and the decryption condition arrives, whether revocation information that identifies a revoked user who is no longer the decryption-permission user, has been added to the decryption condition, and in a case wherein the revocation information has been added to the decryption condition, to remove the revoked user from the decryption condition while the encrypted data remains in an encrypted state, to transmit the encrypted data and the decryption condition from which the revocation information has been removed, to a re-encryption apparatus that performs re-encryption in a proxy re-encryption scheme, the transmission to the re-encryption apparatus being performed prior to decryption, and to receive from the re-encryption apparatus, the encrypted data that has been re-encrypted in the proxy re-encryption scheme using the decryption condition from which the revocation information has been removed, and
update the encrypted data that has been re-encrypted and received, and the decryption condition from which the revocation information has been removed; and
a key update apparatus including second processing circuitry to update a decryption key used for decryption of the encrypted data when the update timing arrives.

5. The data updating system as defined in claim 4, wherein
in the data storage apparatus, the first processing circuitry updates the encrypted data that has been re-encrypted and received, and the decryption condition from which the revocation information has been removed, using update information used for update of a master public key being a master key of an encryption key used for encryption of the encrypted data, and a master secret key being a master key of the decryption key, and wherein
in the key update apparatus, the second processing circuitry updates the decryption key using the update information.

6. The data updating system as defined in claim 5, wherein in the key update apparatus, the second processing circuitry receives the update information from a key generation apparatus that generates the update information and updates the master public key and the master secret key using the update information; and transmits the update information that has been received, to the data storage apparatus, and updates the decryption key using the update information received, and wherein, in the data storage apparatus, the first processing circuitry receives the update information from the key update apparatus, and updates the encrypted data that has been re-encrypted and received, and the decryption condition from which the revocation information has been removed, using the update information received.

7. The data updating system as defined in claim 4, wherein in the key update apparatus, the second processing circuitry determines whether or not to deem-consider a decryption key to be an object of update, and updates only a decryption key that has been determined as the object of update.

8. The data updating system as defined in claim 5, wherein in the key update apparatus, in accordance with a date and time when a decryption key has been updated last, the second processing circuitry selects update information used for updating the decryption key, and updates the decryption key using the update information selected.

9. A data processing method, comprising by a computer that stores encrypted data that has been encrypted, while remaining in an encrypted state, and stores a decryption condition being a parameter to control permitted decryption of the encrypted data, where a decryption-permission user who is permitted to decrypt the encrypted data is defined in a decryption condition that does not require decryption of said encrypted data in order to read, in a case where revocation information which identifies a revoked user who is no longer the decryption-permission user, has been added to the decryption condition when update timing to update the encrypted data and the decryption condition arrives, processing the revocation information to remove the revoked user from the decryption condition while the encrypted data remains in an encrypted state, transmitting the encrypted data and the decryption condition from which the revocation information has been removed, to a re-encryption apparatus that performs re-encryption in a proxy re-encryption scheme prior to decryption, receiving from the re-encryption apparatus, the encrypted data that has been re-encrypted in the proxy re-encryption scheme using the decryption condition from which the revocation information has been removed, and updating the encrypted data that has been re-encrypted and received, and the decryption condition from which the revocation information has been removed.

10. A non-transitory computer readable medium storing a data processing program that causes a computer that stores encrypted data that has been encrypted while remaining in an encrypted state, and stores a decryption condition being a parameter to control permitted decryption of the encrypted data, where a decryption-permission user who is permitted to decrypt the encrypted data is defined in the decryption condition that does not require decryption of said encrypted data in order to read;

a revocation information removing processing to remove, in a case where revocation information identifies a revoked user who is no longer the decryption-permission user, has been added to the decryption condition when update timing to update the encrypted data and the decryption condition arrives, processing the revocation information to remove the revoked user from the decryption condition while the encrypted data remains in an encrypted state, to transmit the encrypted data and the decryption condition from which the revocation information has been removed, to a re-encryption apparatus that performs re-encryption in a proxy re-encryption scheme, the transmission to the re-encryption apparatus being performed prior to decryption, and to receive from the re-encryption apparatus, the encrypted data that has been re-encrypted in the proxy re-encryption scheme using the decryption condition from which the revocation information has been removed; and a refresh processing to update the encrypted data that has been re-encrypted and received by the revocation information removing processing, and the decryption condition from which the revocation information has been removed.

* * * * *